(12) United States Patent
Wang et al.

(10) Patent No.: US 7,397,415 B1
(45) Date of Patent: Jul. 8, 2008

(54) SYSTEM AND METHOD FOR DETECTING AND DE-INTERLEAVING RADAR EMITTERS

(75) Inventors: Paul C. Wang, Ridgewood, NJ (US); Matthew Orr, Harriman, NY (US); Mitchell Sparrow, Wayne, NJ (US); Martin Apa, Wayne, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 228 days.

(21) Appl. No.: 11/345,949

(22) Filed: Feb. 2, 2006

(51) Int. Cl.
*G01S 7/36* (2006.01)
(52) U.S. Cl. .......................... 342/13; 342/40; 342/59; 342/159
(58) Field of Classification Search ............ 342/40
See application file for complete search history.

(56) References Cited

U.S. PATENT DOCUMENTS

| | | | |
|---|---|---|---|
| 4,679,050 A | | 7/1987 | Bergman |
| 4,721,958 A | * | 1/1988 | Jenkin ......................... 342/13 |
| 4,918,455 A | * | 4/1990 | Maier .......................... 342/13 |
| 5,381,150 A | * | 1/1995 | Hawkins et al. ............... 342/13 |
| 5,583,505 A | * | 12/1996 | Andersen et al. .............. 342/13 |
| 6,337,654 B1 | | 1/2002 | Richardson et al. |
| 6,437,728 B1 | | 8/2002 | Richardson et al. |
| 6,940,450 B2 | | 9/2005 | Blunt et al. |
| 2005/0128197 A1 | * | 6/2005 | Thrun et al. ................. 345/421 |

OTHER PUBLICATIONS

Iterative Self Organizing Data Analysis Techniques (ISODATA), by J. T. Tou and R. C. Gonzalez, Pattern Recognition Principles, Addison-Wesley, 1974, Chapter 3, pp. 75-109.
"The minimum description length criterion applied to emitter number detection and pulse classification" Liu J. et al., Statistical Signal and Array Processing, 1998, Proceedings, Ninth IEEE SP Workshop on Sep. 14-16, 1998 pp. 172-175.
"Fractal feature extraction of radar emitter signals", Gexiang Zhang et al., Environmental Electromagnetics, 2003, CEEM 2003, Proceedings Asia-Pacific Conference on Nov. 4-7, 2003 pp. 161-164.
"Complexity feature extraction of radar emitter signals", Gexiang Zhang et al. Environmental Electromagnetics, 2003, CEEM 2003, Proceeding, Asia-Pacific Conference on Nov. 4-7, 2003 pp. 495-498.
"Online Clustering Algorithms for Radar Emitter Classification", Jun Liu et al., Pattern Analysis and Machine Intelligence, IEEE Transactions on vol. 27, Issue 8, Aug. 2005, pp. 1185-1196.

* cited by examiner

*Primary Examiner*—Thomas H. Tarcza
*Assistant Examiner*—Timothy A Brainard
(74) *Attorney, Agent, or Firm*—RatnerPrestia

(57) ABSTRACT

A method of classifying radar emitters includes the steps of: (a) receiving pulses from multiple radar emitters; (b) categorizing received pulses based on pulse data descriptors (PDWs); (c) forming clusters of received pulses based on the PDWs; and (d) de-interleaving pulses from the cluster using one of a differential time of arrival (DTOA) histogram technique, a spectrum estimation technique, or a Hough transform technique. Step (a) includes receiving the pulses during a predetermined time interval and storing the received pulses as a snapshot representing the pulses present during the predetermined time interval.

19 Claims, 22 Drawing Sheets

SYSTEM AND METHOD FOR DETECTING AND DE-INTERLEAVING RADAR EMITTERS

TECHNICAL FIELD

The present invention relates, in general, to radar identification. More specifically, the present invention relates to sorting signals received from multiple emitters into data clusters, and processing each data cluster to obtain de-interleaving of pulse trains from the multiple emitters.

BACKGROUND OF THE INVENTION

Radars emit a variety of signals that may characterize and identify them. Each radar may emit a specific pulse amplitude and a specific fixed radio frequency (RF) or a variable RF ranging over a fixed bandwidth. Each may emit a fixed pulse repetition frequency (PRF) or a fixed pulse repetition interval (PRI) and may be of a certain pulse width (PW).

A radar may also emit a fixed, dwell-switched PRI or a multiple-step, multiple-position staggered PRI. In addition, a radar may emit a pattern-type of PRI, such as a sawtooth, triangular, sinusoidal, jittered, or pseudo-random pattern.

An aircraft flying into a region with an onboard wideband receiver may detect a variety of signals emitted from multiple radars located in that region. Unless these signals are sorted and separated from each other, it is not possible for the aircraft to determine the types of classes of radars it is about to encounter. It does not know whether the radars are hostile and does not know whether the radars present a high or low threat to the incoming aircraft.

A need, therefore, exists for an aircraft to be able to sort and identify a variety of radars that are emitting energy towards the aircraft. The present invention addresses this need.

SUMMARY OF THE INVENTION

To meet this and other needs, and in view of its purposes, the present invention provides a method of classifying radar emitters including the steps of: (a) receiving pulses from multiple radar emitters; (b) categorizing received pulses based on pulse data descriptors (PDWs); (c) forming clusters of received pulses based on the PDWs; and (d) extracting pulses from at least one of the formed clusters, based on pulse repetition intervals (PRIs) between the extracted pulses, to form a pulse train belonging to a radar emitter. Step (d) includes de-interleaving pulses from the cluster using a differential time of arrive (DTOA) histogram technique. The method further includes subtracting a TOA of each pulse from every subsequent time of arrival (TOA) of other pulses to form differential TOAs, and accumulating the differential TOAs which are substantially similar to each other into respective bins to form the DTOA histogram. Step (a) includes receiving the pulses during a predetermined time interval and storing the received pulses as a snapshot representing the pulses present during the predetermined time interval.

In another embodiment, the method includes de-interleaving pulses from the cluster using a spectrum estimation technique. The method includes denoting a plurality of pulse trains in the cluster as a complex signal; forming a discrete Fourier transform (DFT) of the complex signal; and determining a number for the plurality of pulse trains and a frequency of each pulse train.

In yet another embodiment the method includes de-interleaving pulses from the cluster using a Hough transform technique. The method includes calculating a straight line, based on TOA of pulses from the cluster versus TOA modulo by t, where t is an arbitrary window width; determining a slope of the straight line; and calculating a pulse repetition interval (PRI) of a pulse train in the cluster based on the slope of the straight line.

In still another embodiment, the invention includes a method of classifying radar emitters having the steps of: (a) receiving pulses from multiple radar emitters; (b) categorizing received pulses based on pulse data descriptors (PDWs); (c) forming clusters of received pulses based on the PDWs; and (d) de-interleaving pulses from the cluster using one of a differential time of arrive (DTOA) histogram technique, a spectrum estimation technique, or a Hough transform technique. Step (a) includes receiving the pulses during a predetermined time interval and storing the received pulses as a snapshot representing the pulses present during the predetermined time interval.

Yet another embodiment includes a system for classifying radar emitters having a receiver for receiving a plurality of signals from radar emitters, and a processor coupled to the receiver for (a) generating data components for each signal received from the radar emitters, (b) forming multi-dimensional samples from the generated data components, and (c) sorting the multi-dimensional samples into a plurality of data clusters, based on their respective proximity to a center of each data cluster. The processor also extracts pulses from at least one of the formed clusters, based on pulse repetition intervals (PRIs) between the extracted pulses, to form a pulse train belonging to a radar emitter. The processor is configured for de-interleaving pulses from the at least one cluster using one of a differential time of arrival (DTOA) histogram technique, a spectrum estimation technique, or a Hough transform technique.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

The proliferation of radar threats agile in frequency (PRF) and/or pulse repetition interval (PRI) has placed an ever-increased burden on radar warning receiver (RWR) and electronic counter measures (ECM) systems to correctly intercept, identify and countermeasure these threats. As will be explained, the present invention performs threat clustering and pulse train de-interleaving of threat radars in various dense electronic warfare (EW) environments.

Figure 1:
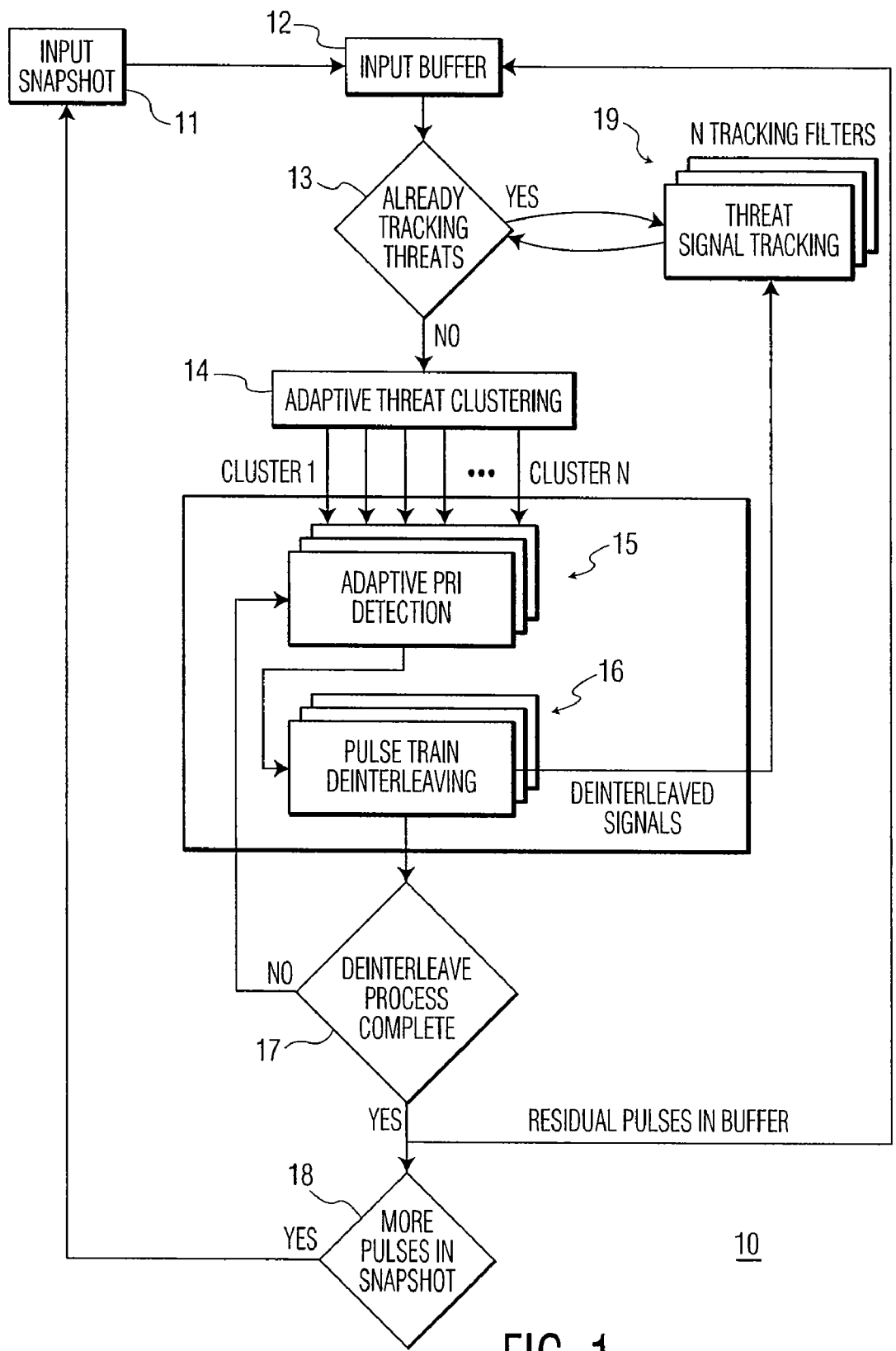
FIG. 1 is a functional block diagram of a system for radar threat detection and pulse train de-interleaving, in accordance with an embodiment of the present invention.

Referring to FIG. 1, there is shown a functional block diagram of a system for radar threat detection and pulse train de-interleaving, in accordance with an embodiment of the present invention. The radar detection and pulse train de-interleaving system, generally designated by 10, includes input snapshot module 11, input buffer module 12, adaptive threat clustering module 14, adaptive PRI detection module 15, pulse train de-interleaving module 16 and threat signal tracking module 19. These modules are described below.

Input snapshot module 11 provides a process for collecting different threat pulses that are received during a predetermined interval of time. Such interval of time may be fixed based on the threat environment and/or the processing throughput of system 10. Exemplary snapshot intervals of time may vary between 4 millisecond duration to 200 millisecond duration, for example.

In the embodiment of system 10, signal processing is performed on all the threat pulses stored in the input snapshot module during one snapshot interval of time. An input snapshot is defined as a collection of pulse descriptor words (PDWs) describing the characteristics of threat pulses intercepted/processed by the RWR/ESM system (not shown). Attributes (or parameters) used in a PDW, generally, include a pulse's (a) time of arrival (TOA), (b) radio frequency (RF), (c) pulse width (PW), (d) pulse amplitude (PA) and (e) angle of arrival (AOA), when available. Depending on the pulse density of the EW environment, the entire input snapshot or a subset of the input snapshot is sent sequentially to input buffer 12 for processing.

To reduce processing throughput, each pulse in input buffer 12 is examined to determine whether it belongs to a pulse train that is already being de-interleaved and tracked by the tracking filters of threat signal tracking module 19. Pulses which meet the tracking conditions (e.g. tracking gates in TOA and/or RF) are removed from input buffer 12 and sent to threat signal tracking module 19 to update a respective tracking filter.

Whether a pulse in input buffer 12 belongs to a pulse train that is already de-interleaved and tracked by the tracking filters is performed by decision box 13. If decision box 13 determines that the pulse belongs to a pulse train that is already de-interleaved and tracked, the pulse is removed from input buffer 12. If decision box 13, on the other hand, determines that the pulse in input buffer 12 is not already being tracked by the tracking filters, system 10 sends that pulse to adaptive threat clustering module 14.

As shown in FIG. 1, adaptive threat clustering module 14 provides threat clustering using an ITT developed adaptive algorithm. The adaptive algorithm is based on a technique known as ISODATA (Iterative Self Organizing Data Analysis) which is an unsupervised iterative classification algorithm used for pattern recognition. The adaptive threat clustering algorithm operates iteratively. At each iteration, the clustering result is examined to determine whether (a) additional clusters are needed by splitting current clusters, and/or (b) multiple clusters may be eliminated by merging current clusters.

The splitting and merging of clusters are conducted based on similarity tests, such as using Euclidean distance between all radar pulses (or PDWs). Threat clustering ends when either (a) no clustering activity is required (or detected), or (b) a pre-set number of iterations is completed. The threat clustering algorithm usually converges and assigns all pulses (or PDWs) in the input buffer, during a predetermined snapshot of time, to a finite set of clusters.

To increase processing efficiency, threat clustering operates adaptively according to the input buffer size, the attributes selected for clustering and the cluster size selected for acquiring frequency/PRI agile threats. The operation of adaptive threat clustering module 14 is described in greater detail later.

Continuing the description of FIG. 1, multiple clusters (1 to N) are established by adaptive threat clustering module 14. The radar pulses in each established cluster are then provided as input signals to adaptive PRI detection module 15. It will be appreciated that each cluster is classified based on a collection of PDWs that describe the characteristics of a threat pulse intercepted or processed by the RWR/ESM system. As already described, attributes used in a PDW may include a pulse's TOA, RF, PW, PA and/or AOA. It is possible that a cluster may include pulses which belong to different radar emitters, but have been grouped into the same cluster. Accordingly, further processing of each pulse in a cluster is provided by the present invention in adaptive PRI detection module 15 and pulse train de-interleaving module 16 of system 10.

As illustrated in FIG. 1, radar pulses in each cluster are processed for PRI detection and pulse train de-interleaving sequentially in module 15 and module 16. As will be explained later, depending on the operational condition and the EW environment, one of three PRI sorting techniques are adaptively selected for implementation by module 15. Generally, a differential time-of-arrival (DTOA) histogram technique is used in a low density EW environment (or small input buffer). A spectrum estimation technique is used in a high density EW environment (or large input buffer). A Hough transform technique is used primarily for refining a PRI when the refinement is prompted by the other two techniques. All three techniques are based on the TOA of each pulse, and all three techniques are capable of detecting fixed, dwell-switched and multiple-step, multiple-position stagger PRIs.

Yet another technique is used by the present invention, in addition to the above three techniques. This additional technique is referred to herein as the pattern search algorithm. The pattern search algorithm detects "pattern" PRIs, such as a sawtooth, triangular, sinusoidal, jitter, or pseudo-random pattern. It is used when pulse trains with fixed, dwell-switched and stagger PRIs have all been detected, de-interleaved and removed from input buffer 12.

Referring next to pulse train de-interleaving module 16, the radar pulse trains of detected PRIs from the adaptive PRI detection module are received in module 16. The radar pulse trains of the detected PRI's are then de-interleaved by the module. De-interleaved pulses are then sent to threat signal tracking module 19 to establish new or refresh existing tracking filters.

The de-interleaved pulse trains are sent from module 16 to threat signal tracking module 19. As shown, module 19 includes N tracking filters, where each filter maintains track of one de-interleaved pulse train. It will be appreciated that the number (N) of tracking filters may be the same or different from the number (N) of clusters.

Previous de-interleaved pulse trains are tracked and updated by the tracking filters. Tracking gates (in TOA and/or RF) for the pulse trains currently being tracked are generated to test incoming pulses from input buffer 12. Pulses which fall within the tracking gates are removed from the input buffer and sent to threat signal tracking module 19 to update the tracking filters.

It will be appreciated that decision box 13 provides an alert to threat signal tracking module 19, in order to inform the appropriate tracking filter that a pulse is available and that the pulse should be removed from input buffer 12. After the appropriate tracker removes the pulse from input buffer 12, threat signal tracking module 19 returns control to decision box 13.

Decision box 17 determines whether the de-interleaving process is complete. If the de-interleaving process is complete, system 10 branches back to input buffer 12 to determine if there are residual pulses left in the buffer. If decision box 17, however, determines that the de-interleaving process is not complete, then system 10 branches back to adaptive PRI detection module 15 and continues the PRI detection process.

Also included in system 10 is decision box 18, which determines if more pulses are present in input snapshot 11. If more pulses are present, then system 10 continues sending additional pulses from input snapshot 11 into input buffer 12. If, however, no more pulses are present in the input snapshot, then the process outlined in FIG. 1 is terminated.

After removing de-interleaved pulses from a threat cluster, additional adaptive PRI detection is performed on any remaining pulses. This sequential and re-occurring operation of adaptive PRI detection module 15 and pulse train de-interleaving module 16 continues until either (a) all pulses in the input buffer are de-interleaved, or (b) no PRI can be derived from the residual pulses. These residual pulses are then sent to the next input buffer, by way of input snapshot 11, for the next round of processing.

Subsequent input buffers are processed with the same processing method. This process continues until all threat pulses in input snapshot 11 are either sorted and tracked, or are sent to the next snapshot for further processing.

The adaptive threat clustering module, designated as 14 in FIG. 1, will now be described in greater detail by referring to U.S. application Ser. No. 10/728,468, filed on Dec. 15, 2003, by inventors Paul C. Wang and Charles R. Ward. U.S. application Ser. No. 10/728,468 and the present application are commonly owned by ITT Manufacturing Enterprises, Inc. of Wilmington, Del.

U.S. application Ser. No. 10/728,468 is incorporated herein by reference in its entirety. Portions of U.S. application Ser. No. 10/728,468 are described below with references to FIGS. 2 and 3 of the present application.

Adaptive threat clustering module 14 forms clusters from a set of input data (samples), where each cluster consists of very similar data (samples). The module first defines a measure of pattern similarity and establishes a rule for assigning individual samples to the domain of a specific cluster center. The module uses a Euclidean distance between two data points x and z, $$D=\|x-z\|$$

as a measure of pattern similarity. The smaller the distance, D, the greater is the similarity between x and z.

After a measure of pattern similarity is selected, the module sorts (or partitions) samples into cluster domains. The Euclidean distance measure, D, lends itself to this procedure, because it is a good measure of proximity. However, because the proximity of two patterns is a relative measure of similarity, it is necessary for the module to establish a threshold to define degrees of acceptable similarity for the clustering process, or method.

A performance-index is chosen to measure the degrees of similarity and a procedure is used which minimizes the chosen performance index. One such performance index is the sum of the squared errors resulting from the cluster, and is a proximity measure given by $$J = \sum_{j=1}^{Nc} \sum_{x \in Sj} \|x - m_j\|^2$$

where Nc is the number of cluster domains (or simply clusters), Sj is the set of samples belonging to the jth domain, and $$m_j = (1/Nj) \sum_{x \in Sj} x$$

is the sample mean vector of set Sj, with Nj representing the sample size of Sj.

There are other performance indices used in the method of clustering the samples, such as: (1) average squared distances between samples in a cluster domain, (2) average squared distances between samples in different cluster domains, (3) indices based on a scatter matrix and (4) minimum and maximum variance indices.

Figure 3:
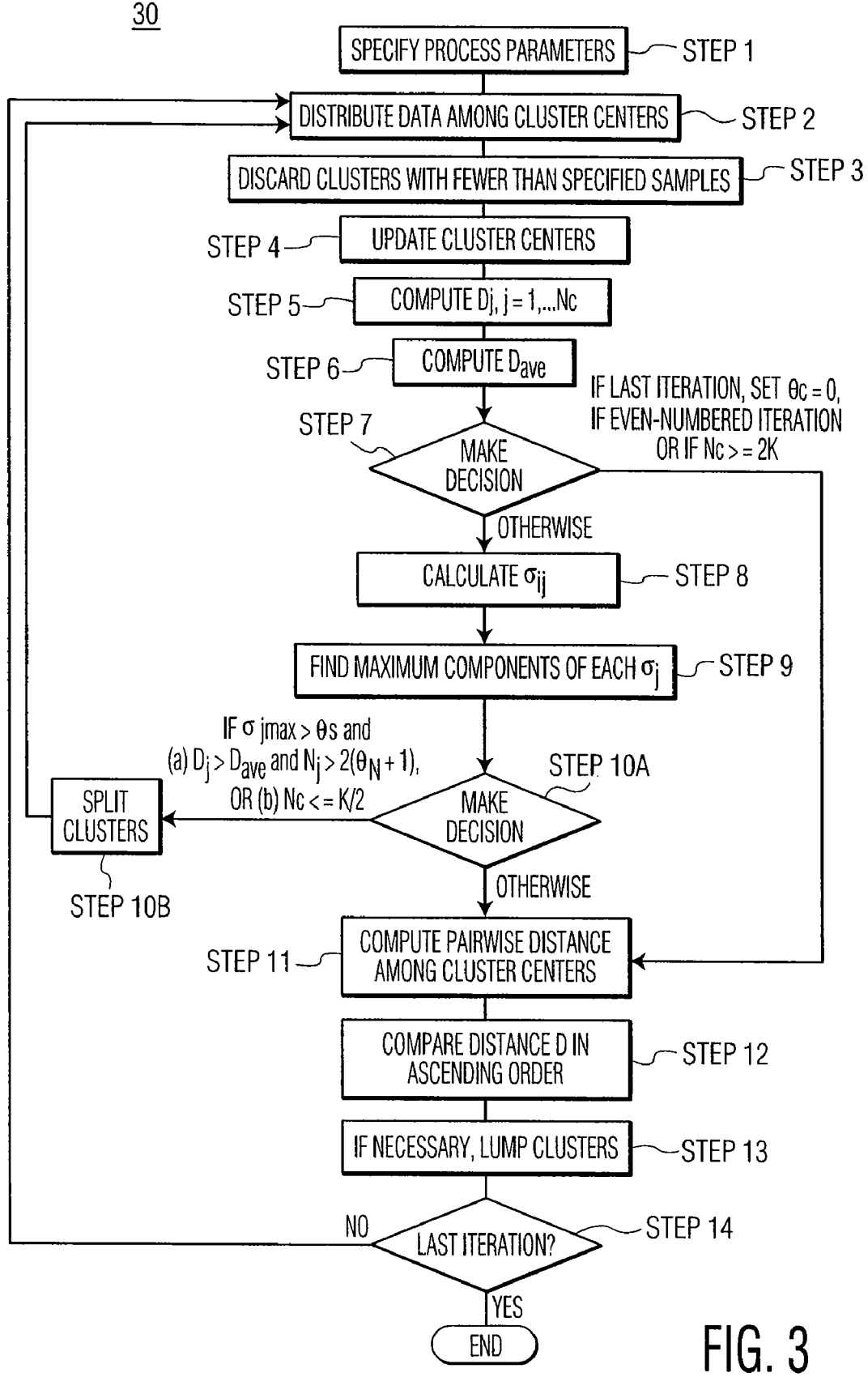
FIG. 3 is a flow diagram of a algorithm referred to herein as the ISODATA algorithm for arranging multiple radar threats into different clusters, in accordance with an embodiment of the present invention.

An embodiment used by adaptive threat clustering module 14 is based on an algorithm referred to as Iterative Self Organizing Data Analysis Techniques (ISODATA). The ISODATA algorithm, generally designated as 30, is shown in FIG. 3, and is further described below.

For a set of N samples, $\{x_1, x_2, \ldots, x_N\}$, ISODATA clustering algorithm includes the following steps:

Step 1: Specify various clustering parameters, as follows:
K=number of cluster centers desired;
$\theta_N$=the minimum number of samples allowed in a cluster;
$\theta_S$=standard deviation parameter;
$\theta_C$=lumping parameter;
L=maximum number of pairs of cluster centers which may be lumped;
I=number of iterations allowed.

Step 2: Distribute the N samples among the present cluster centers, using the following relationship:

$$x \in Sj \text{ if } \|x-zj\| \leq \|x-zi\|, i=1, 2, \ldots, Nc; i \neq j$$

for all x in the sample set. In this notation, Sj represents the subset of samples assigned to the cluster center zj.

Step 3: Discard sample sets with fewer than $\theta_N$ members. That is, if for any j, $Nj<\theta_N$, discard Sj and reduce Nc by 1.

Step 4: Update each cluster center zj, j=1, 2, . . . , Nc, by setting it equal to the sample mean of its members (Sj), as follows:

$$z_j = \frac{1}{N_j}\sum_{x \in Sj} x, \ j=1, 2, \ldots, Nc$$

where Nj is the number of samples in Sj.

Step 5: Compute the average distance Dj of samples in cluster domain Sj from their corresponding cluster center, using the following relationship:

$$D_j = \frac{1}{N_j}\sum_{x \in} \|x - zj\|, \ j=1, 2, \ldots Nc$$

Step 6: Compute the overall average distance of the samples from their respective cluster centers, using the following relationship:

$$D_{ave} = \frac{1}{N_c}\sum_{j=1}^{Nc} N_j D_j$$

Step 7: The following decisions are then made:
(a) If this is the last iteration, set $\theta C=0$ and go to Step 11;
(b) If $Nc \leq K/2$, then go to Step 8;
(c) If this is an even-numbered iteration, or if $Nc \geq 2K$, go to Step 11; otherwise continue.

Step 8: Find the standard deviation vector $\sigma_j=(\sigma_{ij}, \sigma_{2j}, \ldots, \sigma_{nj})'$ for each sample subset, using the following relationship:

$$\sigma_{ij} = \sqrt{\frac{1}{N_j}\sum_{x \in Sj}(x_{ik} - z_{ij})^2}, \ i=1, 2, \ldots n; j=1, 2, \ldots, Nc$$

where n is the sample dimensionality, $x_{ik}$ is the ith component of the kth sample in Sj; $z_{ij}$ is the ith component of $z_j$, and Nj is the number of sample in Sj. Each component of $\sigma_j$ represents the standard deviation of the samples in Sj along a principal coordinate axis.

Step 9: Find the maximum component of each $\sigma_j$, j=1, 2, . . . , Nc and denote it by $\sigma_{jmax}$.

Step 10: If for any $\sigma_{jmax}$, j=1, 2, . . . , Nc, there are $\sigma_{jmax}>\theta_s$ and
(a) $Dj>D_{ave}$ and $Nj>2(\theta_N+1)$,
or
(b) $Nc \leq K/2$ then split zj into two new cluster centers $zj^+$ and $zj^-$, delete zj, and increase Nc by 1.

Cluster center $zj^+$ is formed by adding a given quantity $\gamma_j$ to the component zj which corresponds to the maximum component of $\sigma_j$, ($\sigma_{jmax}$). Similarly, $zj^-$ is formed by subtracting $\gamma_j$ from the same component of zj. One way of specifying $\gamma_j$ is to let it be equal to a fraction of $\sigma_{jmax}$, that is $\gamma_j=\sigma_{jmax}$ with 0<k<1.

If splitting took place in this step, then go to Step 2; otherwise continue.

Step 11: Compute the pairwise distances Dij between all cluster centers, as follows:

$$D_{ij}=\|z_i-z_j\|, i=1, 2, \ldots, Nc-1; j=i+1, \ldots, Nc$$

Step 12: Compare the distances Dij against the parameter $\theta_C$. Arrange the L smallest distances which are less than $\theta_C$ in ascending order, as follows:

$$[Di_1j_1, Di_2j_2, \ldots, Di_LL_L]$$

where $Di_1j_1<Di_2j_2<\ldots<Di_Lj_L$ and L is the maximum number of pairs of cluster centers which may be lumped together. The lumping process is described below in Step 13.

Step 13: With each distance $Di_kj_k$, there is associated a pair of cluster centers $zi_k$ and $zj_k$. Starting with the smallest of these distances, perform a pairwise lumping operation, according to the following relationship:

For k=1, 2, . . . , L, if neither $zi_k$ nor $zj_k$ has been used in lumping during this iteration, merge these two cluster centers, using the following relationship:

$$z_k^* = \frac{1}{N_{ik} + N_{jk}}[N_{ik}(z_{ik}) + N_{jk}(z_{jk})]$$

Delete $zi_k$ and $zj_k$ and reduce Nc by 1.

It is noted that only pairwise lumping is allowed and that a lumped cluster center may be obtained by weighting each old cluster by the number of samples in its domain. It will be understood that since a cluster center can only be lumped once, this step may not always result in L lumped centers.

Step 14: If this is the last iteration, the algorithm terminates. Otherwise, go to Step 1 if any of the process parameters requires changing at the user's discretion, or go to Step 2 if the parameters are to remain the same for the next iteration. An iteration is counted every time the procedure returns to Step 1 or 2.

Figure 2:
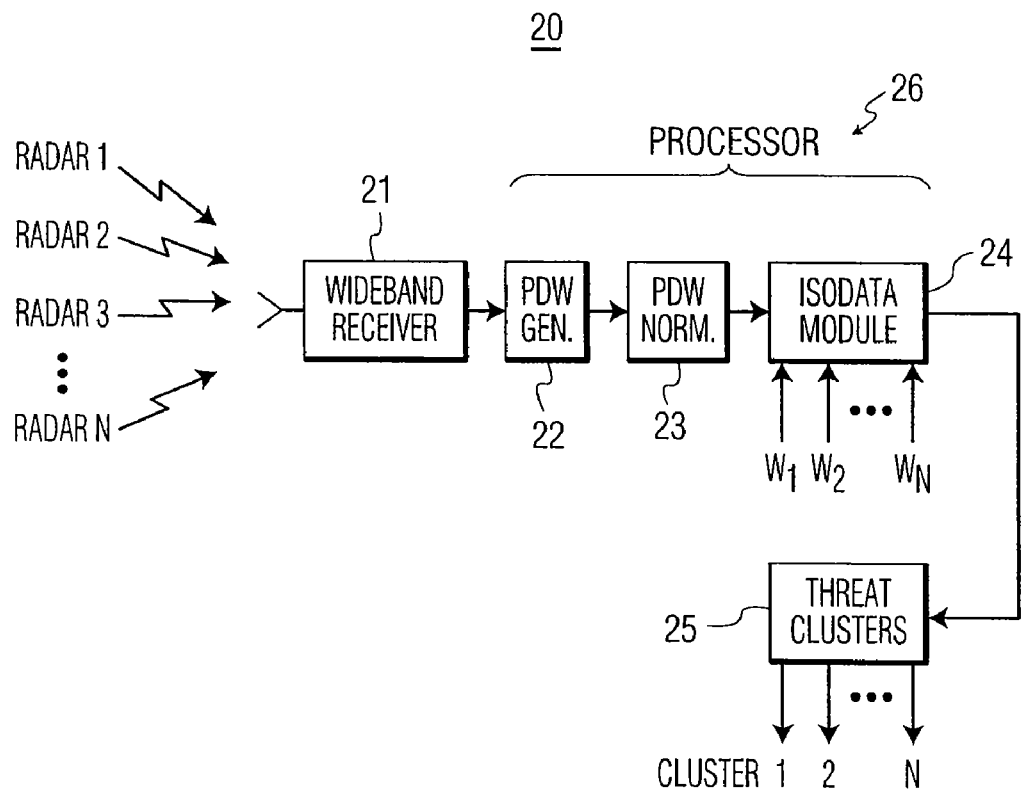
FIG. 2 is a block diagram of a wideband receiver for processing signals from multiple radar threats, and arranging the signals into multiple threat clusters, in accordance with an embodiment of the present invention.
Figure 5A:
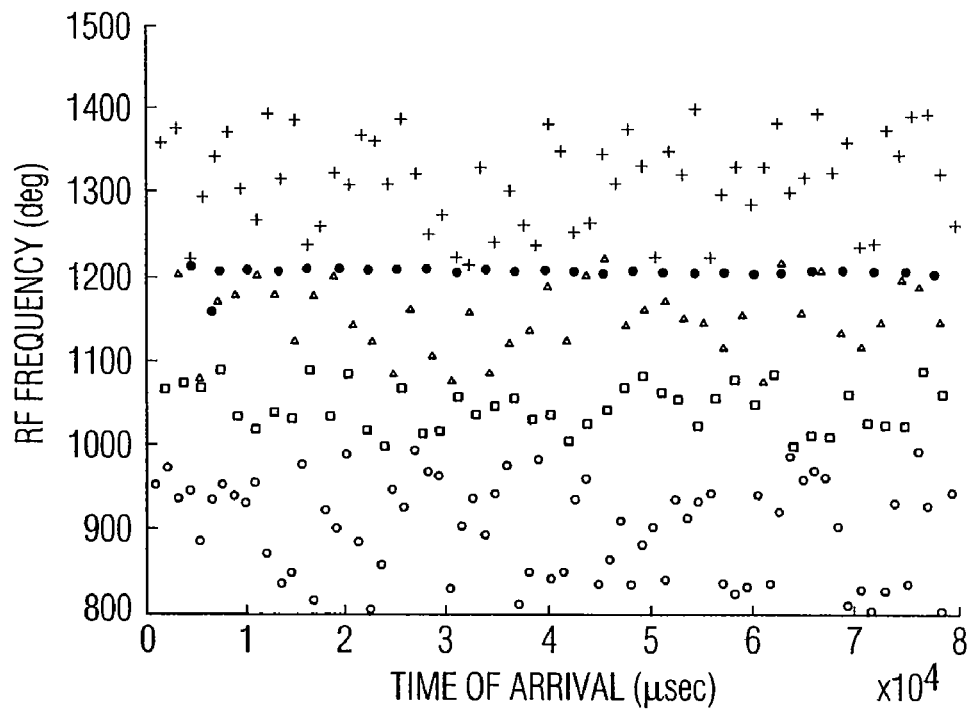
FIGS. 5A and 5B are exemplary plots showing pulse descriptive words (PDWs) of signals from multiple radar threats as they may be intercepted by a wideband receiver during a snapshot of 80 ms duration, in accordance with an embodiment of the present invention.
Figure 5B:
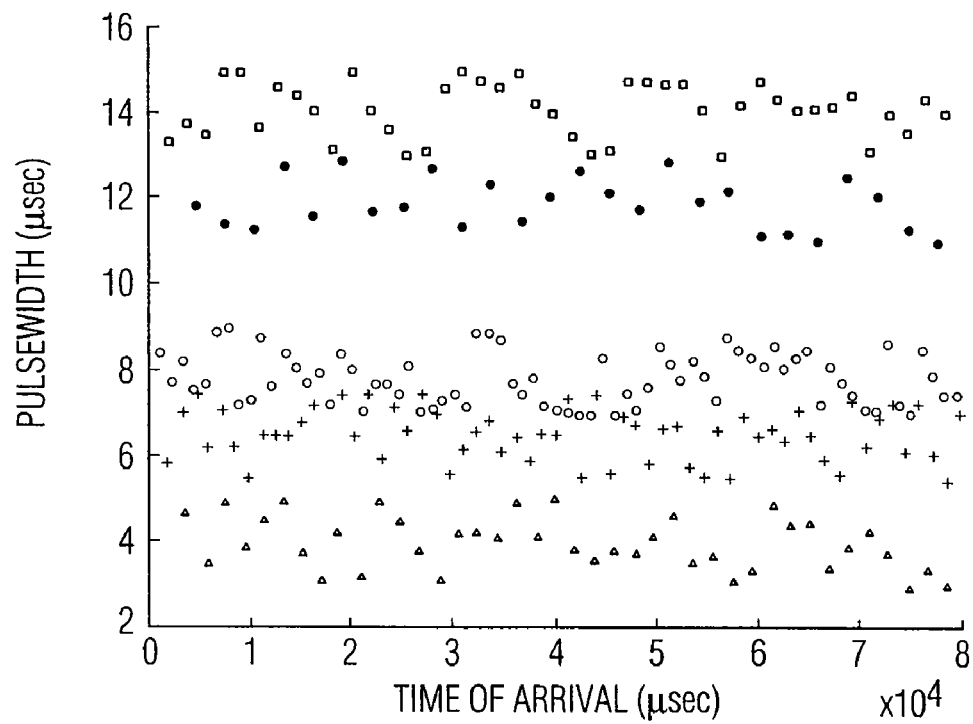

Adaptive threat clustering module 14 generates pulse descriptive words (PDWs) using input snapshot module 11. The snapshot includes PDW mixes from multiple radar threats, as they may be intercepted by wideband receiver 21, as shown in FIG. 2. Exemplary snapshots (80 ms duration) are shown in FIGS. 5A and 5B.

Each PDW, which is a vector, is composed of four components, describing an intercepted radar pulse, as follows: (1) time of intercept (or arrival), TOA, (2) radio frequency, RF, (3) pulse width, PW, and (4) pulse amplitude, PA (not shown). It will be appreciated that in other embodiments of the present invention, less or more than four components (dimensions) of each PDW may be selected. For example, other components may be pulse repetition interval (PRI), modulation type, etc.

Referring to FIG. 2, system 20 includes wideband receiver 21 for receiving desired components of each radar 1-N. Also included is processor 26, coupled to wideband receiver 21, for generating each PDW using PDW generator 22, normalizing each PDW using PDW normalizer 23 and clustering each normalized PDW into a respective cluster using ISODATA module 24. The ISODATA module executes the steps of the ISODATA algorithm. After a predetermined number of iterations of the ISODATA algorithm, the clusters of PDWs may be formed and stored in threat clustering module 25, which may be included in processor 26 or may be a separate module. All the clusters, 1-N (which may or may not be the same as radars 1-N) are provided to adaptive PRI detection module 15 for further processing.

Each raw PDW is normalized by module 23 of system 20, using the following relationship:

$$PDW_{Nor} = [PDW_{Raw} - PDW_{Ave}]/STD_{PDW}$$

where $PDW_{Nor}$ is the individual normalized PDW vector, $PDW_{raw}$ is the individual PDW as intercepted by wideband receiver 21, $PDW_{Ave}$ is the average PDW vector of the entire snapshot, and $STD_{PDW}$ is the standard deviation vector calculated from $PDW_{raw}$ and $PDW_{Ave}$.

In an exemplary embodiment of the invention, a performance index for measuring similarity between two PDWs uses two components, namely RF and PW.

The Euclidean distance, Dij, between PDWs (PDWi and PDWj) is calculated as follows:

$$D_{ij} = w_1(RF_i - RF_j)^2 + w_2(PW_i - PW_j)^2$$

where $(RF_i, PW_i)$ and $(RF_j, PW_j)$ represent $PDW_i$ and $PDW_j$, respectively. Two weights, $w_1$ and $w_2$ are used, as an example, to adjust the relative size of the cluster (or equivalently, the pairwise distance between cluster centers) to be generated in ISODATA. The relative size may be adjusted as a function of the overall frequency and pulse width deviations, which likely are related to the number of input radar threats of the input snapshot, or may be adjusted as a function of dedicated frequency bands in which advanced emitters may reside and need to be clustered into a specific cluster size.

It will also be appreciated that initially at the start of the ISODATA algorithm, the number of clusters may be assumed to be 1. Samples too far away from a center of this original cluster may then be dropped from the cluster and a new cluster may be formed from the dropped samples.

FIG. 5A illustrates a snapshot of the emitters' RF frequency (RF) versus TOA. FIG. 5B illustrates a snapshot of the emitters' pulse width (PW) versus TOA. These figures indicate that radar pulses from multiple threats are overlapped in RF, and PW.

It will be appreciated that system 20 may be used to cluster EW scenarios including mixes of stable radars and advanced radars, such as dwell switched and frequency agile radars.

It will also be appreciated that to cluster advanced emitters having frequency agility capability, the weights ($w_1$, $w_2$, and others, if necessary) used in Euclidean distance calculations between PDWs may be made adaptive, so that PDWs from different threats may be sorted into different clusters and PDWs from the same threat will not be partitioned into multiple clusters. As an example, the weights may be made a function of the operational frequency band of the radar emitter and the size of clusters generated may be adjusted to prevent threat splitting.

Figure 4A:
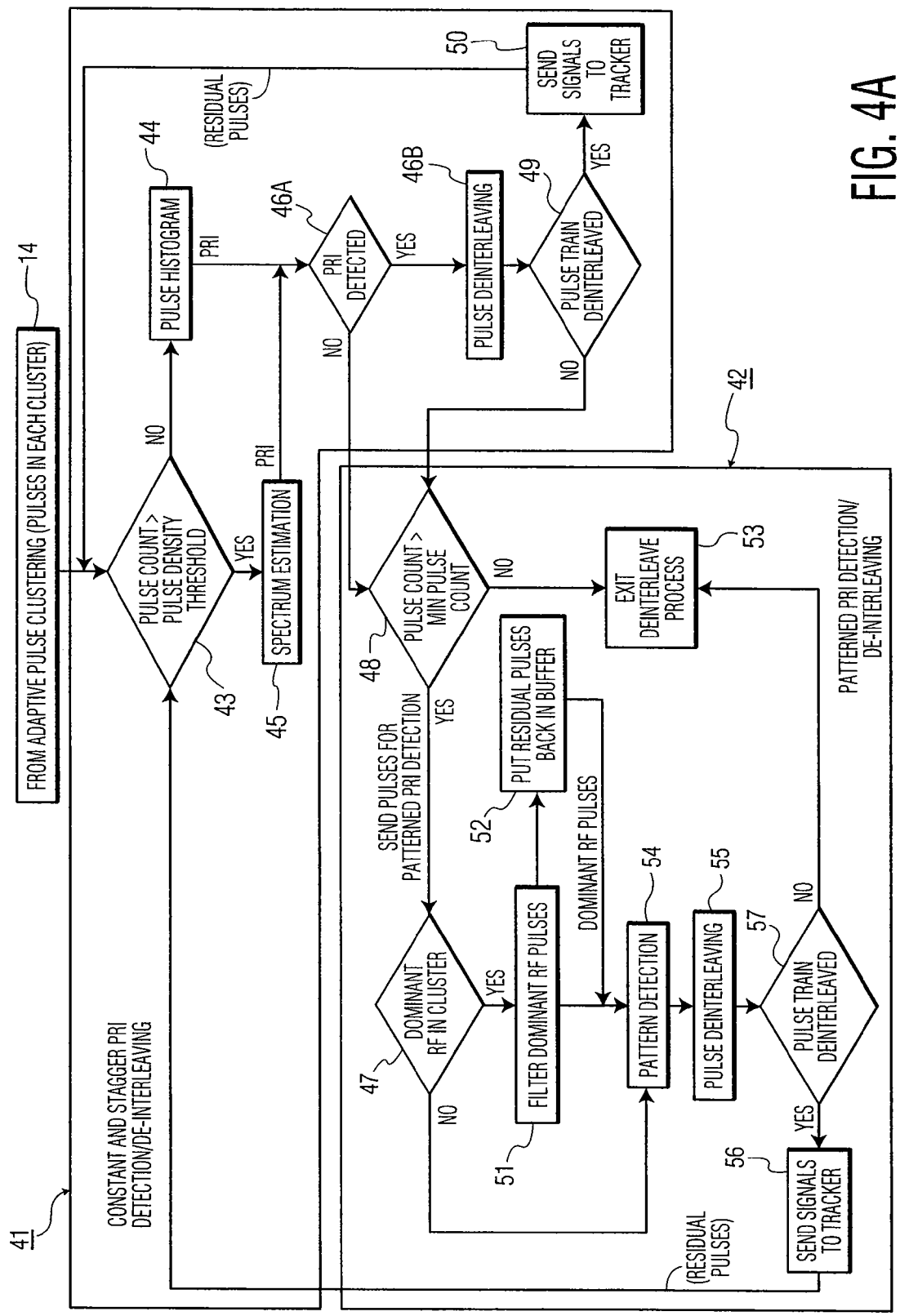
FIGS. 4A, 4B and 4C are functional flow diagrams of a constant and staggered PRI detection/de-interleaving module and a patterned PRI detection/de-interleaving module, both used in the system shown in FIG. 1, in accordance with an embodiment of the present invention.

Referring next to FIG. 4A, the output pulses from each cluster, 1 to N, from adaptive threat clustering module 14 are provided to constant and staggered PRI detection/de-interleaving module 41. It will be appreciated that module 41 detects and de-interleaves pulses that are determined to be of a constant PRI. If the pulses are determined to be of a staggered PRI, then the method branches to the patterned PRI detection/de-interleaving module 42.

The pulses in a single snapshot (80 msec snapshot, for example) are counted by module 41. If the pulse count is greater than a first predetermined threshold or a predetermined pulse density threshold, as determined by decision box 43, module 41 sends the pulses to spectrum estimation module 45 for further processing. If decision box 43, on the other hand, determines that the pulse count is less than this predetermined pulse density threshold, then module 41 sends the pulses to pulse histogram module 44 for further processing.

The pulse density threshold is the number of pulses used in the decision logic in determining when to use the pulse histogram or the FFT based spectrum estimation method for PRI detection. The pulse histogram method is robust and efficient in estimation of the PRI of staggered emitters, while the Fourier based method is better at detecting fixed PRI emitters. The pulse density threshold is derived by the ratio of pulse density observed to the pulse count in a cluster and estimated statistics of the radar threat parameters in the mission environment (e.g. Fixed/Staggered PRI).

As an example, in an environment with heavy EW including mainly fixed PRI emitters the value is set to 300, while in an environment of mostly staggered emitters this value is raised to a range from 1000 and 2000.

The method for de-interleaving pulses used by spectrum estimation module 45 and the method for de-interleaving pulses used by pulse histogram module 44 are described in greater detail later. The pulse histogram method is used to determine the PRI of an emitter, when the density of pulses in the snapshot is low. The spectrum estimation method is used to determine the PRI of an emitter, when the density of pulses in the snapshot is high. The spectrum of the pulses in the snapshot is determined and the highest PRF spectrum is pulled out (de-interleaved). The process is then repeated by module 41 to pull out (de-interleave) the next highest PRF spectrum until the remaining pulses in the snapshot are of a low pulse count. The pulse histogram method may then be used to pull out (de-interleave) the remaining pulses.

If a potential radar PRI is found, as decided by decision box 46A, after having been determined by spectrum estimation module 45 or by pulse histogram module 44, then the determined pulse is sent to pulse de-interleaving module 46B. Each individual pulse in pulse de-interleaving module 46B is sorted statistically to determine whether (1) the pulse belongs to a pulse train already existing and/or defined, (2) the pulse is a member of a new pulse train to be formed, or (3) the pulse is a noise spike and should be ignored.

If the resulting pulse is considered to belong to a single radar threat and, consequently, is considered de-interleaved, as determined by decision box 49, then module 41 sends the pulse to the signal trackers by way of module 50. If the pulse has not been de-interleaved, however, as determined by decision box 49, then the pulse is sent into decision box 48. The assumption at this point is that the pulse belongs to a patterned type of pulse emitter and the patterned PRI detection/de-interleaving module 42 is utilized.

Decision box 48 determines whether the pulse count is greater than a second predetermined threshold, or a minimum pulse count threshold. The minimum count threshold is smaller than the pulse density threshold. If the pulse count is less than the predetermined minimum pulse count threshold, then the system exits the de-interleaving process by way of module 53. If the pulse count is determined to be greater than the minimum pulse count threshold, on the other hand, then the pulses are sent to the patterned PRI detection/de-interleaving module, generally designated as 42.

The minimum pulse count is the number of pulses used in the decision logic in determining when to exit the deinterleaving process. Exiting the current deinterleaving process is a result of insufficient number of pulses to make a confident estimate of the radar threat signal parameters. The minimum pulse count is a constant and is derived by statistics of expected radar threat parameters in the environment. It is tailored and updated for an individual mission.

For example, the pattern detection algorithm may require 70% of the pulses of a patterned PRI emitter. If the PRI pattern of the emitter ranged from 2 msec to 4 msec, an average of 26 pulses would occur within a 80 ms pulse snapshot. The value of the minimum pulse count would then be initialized to process the pattern detection algorithm when at least 18 pulses are available.

The patterned PRI detection/de-interleaving module 42 first determines the dominant RF frequency in the pulses of a particular cluster in the snapshot, by way of decision box 47. If there exists a dominant RF frequency in the cluster, as determined by decision box 47, then the method enters module 51 and filters out the dominant RF frequency pulses. The pattern of the dominant RF frequency pulses are determined by module 54 and pulse de-interleaved by module 55. The pulse train which has been de-interleaved is sent to the signal trackers by way of decision box 57 and module 56.

Returning to module 51, the residual pulses that are not included in the dominant RF frequency are placed back in the buffer, by way of module 52. If there is still another dominant RF frequency, then the pulses of this other dominant RF frequency are also sent into pattern detection module 54 for pulse eventual pulse de-interleaving by module 55. Any left over residual pulses are sent back into module 41 to begin another sequence of the de-interleaving process. Eventually the final pulse count becomes less than the predetermined minimum pulse count threshold (as determined by decision box 48), and the de-interleaving process exits by way of module 53.

It will be appreciated that in an electronic counter measure (ECM) and/or electronic support measure (ESM) system, radar pulse de-interleaving of intercepted threat pulses is a vital part of the electronic warfare (EW) process. The pulse repetition interval (PRI) and other characteristics of a radar threat, as determined by the pulse de-interleaving process, is essential for the ECM/ESM system for conducting threat identification and generating effective countermeasures.

While many approaches to pulse de-interleaving may be possible, techniques based on pulse time-of-arrival (TOA) are implemented by the present invention. These techniques include sequence search and differential TOA histogram.

In a sequence search algorithm, intercepted radar pulses are first collected and formatted in pulse descriptor words (PDW) snapshots. For each snapshot, potential radar pulse trains are formed with PRIs calculated as differences of pulses' TOAs (DTOAs). Each individual pulse in the snapshot is then sorted statistically to determine whether: (1) it belongs to a pulse train already existing and/or defined, (2) it is a member of a new pulse train to be formed, or (3) it is a noise spike and should be ignored. Sequence search algorithms work well in light to medium EW environments, and they are especially effective for de-interleaving pulse trains of fixed and staggered PRI's by way of module 41 of FIG. 4A.

The performance generally deteriorates, however, when the EW environment becomes increasingly dense.

In addition to differential TOA histogram, other techniques for de-interleaving fixed and staggered PRI pulse trains are implemented by the present invention. These techniques include spectrum estimation and Hough transform. A general description for applying these techniques are described in the following paragraphs.

In the differential TOA histogram, each pulse's TOA is subtracted from every subsequent TOA of a pulse within the same snapshot. Then counts of differential TOA are accumulated to form the histogram. Applying this technique to a fixed PRI sequence results in high counts at integral multiples of the PRI. The integral multiples can easily be removed, when they are determined to be harmonics of the fundamental PRI.

When several pulse trains are present, however, counts occur at multiples, sums and differences of all possible PRIs, providing ambiguous results. In order to correctly identify a fixed PRI, sufficient counts at each multiple of the PRI must be observed. A threshold above which the sequence is determined to be present must be defined. The threshold should allow for missing and interfering pulses. If the counts at the PRI harmonics are less than the threshold, then the PRI is determined to be only a subinterval and does not form a sequence.

Figure 6:
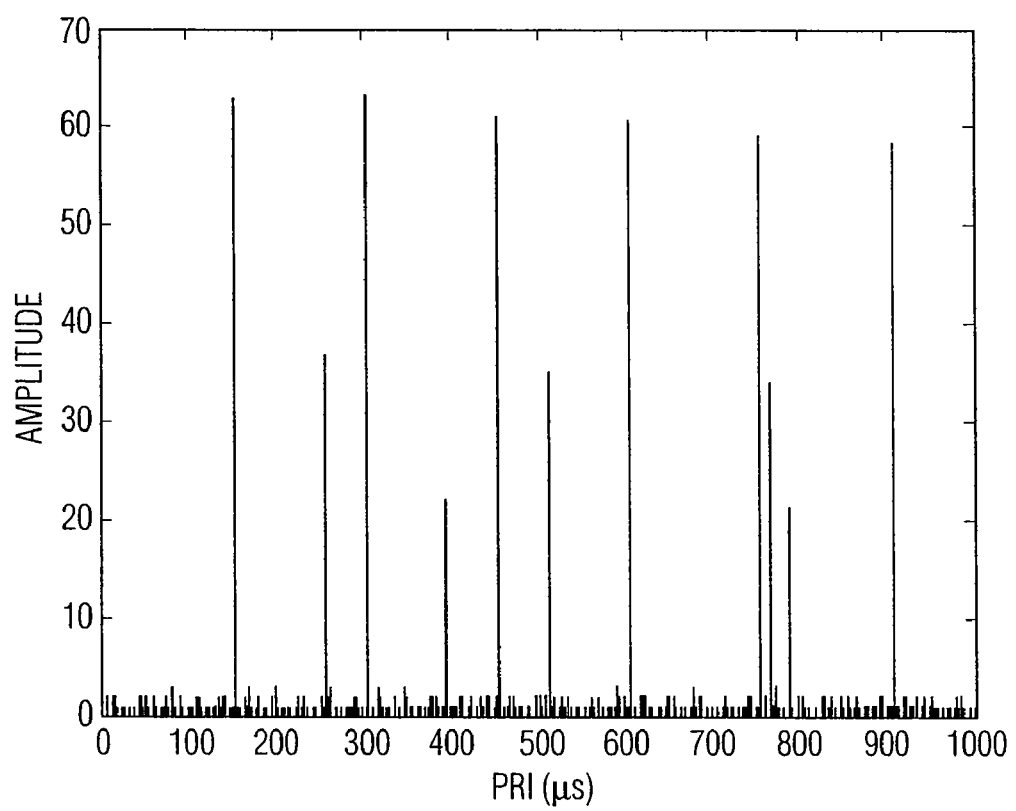
FIG. 6 is an exemplary illustration of a raw differential time of arrival (DTOA) histogram showing three pulse strings with different PRIs, in accordance with an embodiment of the present invention.
Figure 7:
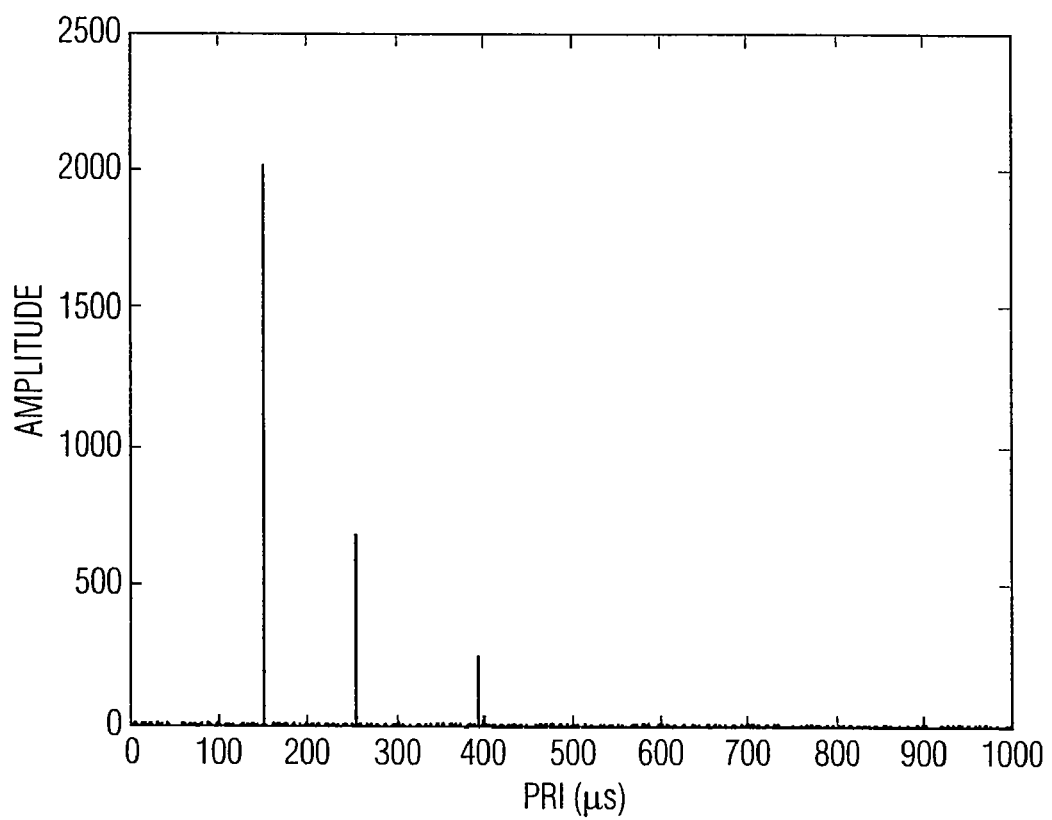
FIG. 7 is a "corrected" histogram of the raw DTOA histogram shown in FIG. 6, in accordance with an embodiment of the present invention.

As an example of a DTOA histogram, FIG. 6 illustrates the result of a snapshot consisting of three pulse trains with PRIs of 151, 255 and 393 us. FIG. 6 is the raw histogram and FIG. 7 is the "corrected" histogram with all harmonics removed.

The differential TOA histogram does not use sequential information. It simply counts the number of event pairs separated by a given PRI. Neither does it identify the sequence. However, since it is based on subtractions, the DTOA histogram technique offers fast processing.

Figure 4B:
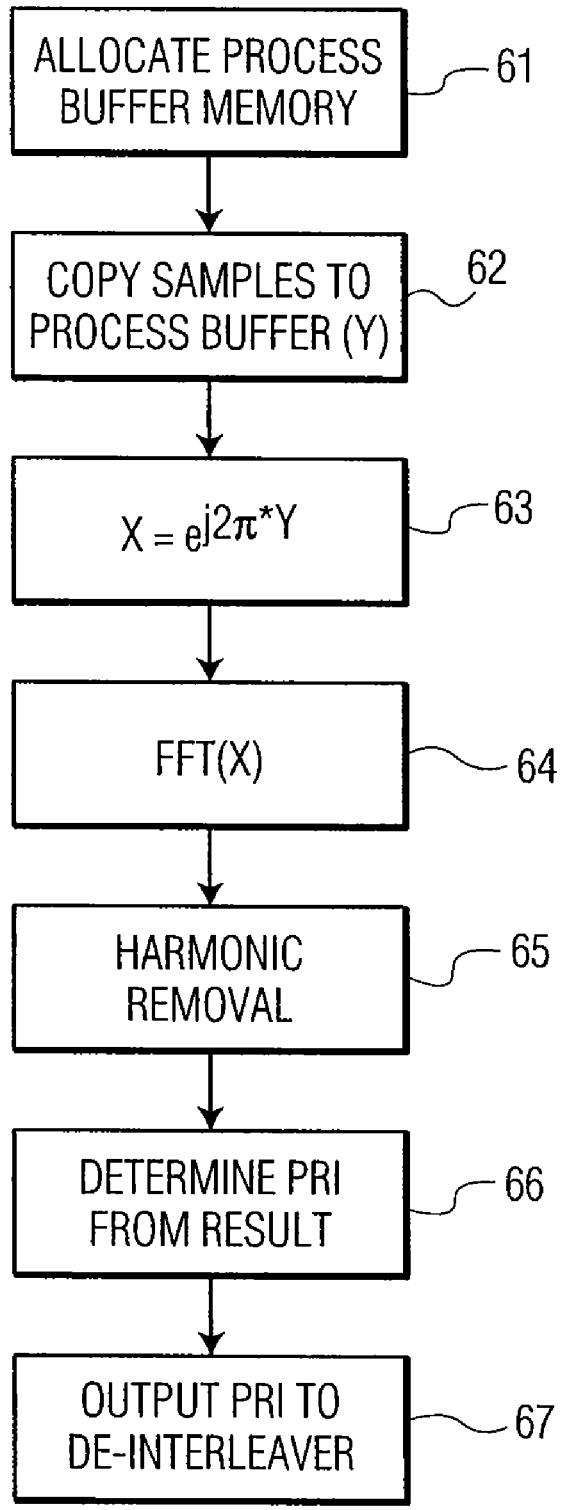

The next technique described is the spectrum estimation technique, which is also shown in FIG. 4B, generally designated by 45. Rather than trying to de-interleave interleaved pulse trains directly, the spectrum estimation technique focuses on determining the number of pulse trains present in the snapshot and determining the pulse repetition frequency (PRF) of each pulse train.

The method first allocates a buffer in memory (step 61) and copies samples to the buffer (step 62). These samples are shown as Y in step 62 of FIG. 4B, and form a complex signal X in step 63. The relationship between Y and X is described below with respect to the complex signal x(n).

Consider, as an example, that there are M periodic pulse trains in a snapshot. Let $T_i$, $f_i$, and $\phi_i$ denote, respectively, the period, frequency and phase of the ith pulse source. The received interleaved signal consists of the superposition of the M pulse trains produced by these sources. Let $t_0, t_1, \ldots t_N$ denote the TOAs of N+1 consecutive pulses in this snapshot. The problem is to determine both the number of pulse trains present and the frequency of each pulse train.

The next step in the method (step 63) is to compose the complex signal x(n):

$$x(n) = e^{j(2\pi/t_N)t_n} \text{ for } n=0, 1, \ldots, N-1$$

The signal x(n) may be thought of as taking the interval $[t_0, t_{N-1}]$, containing the first N TOAs, normalizing its length to approximately $2\pi$, and then wrapping this normalized interval around a unit circle. Note that in this convention, all TOAs are shifted by subtracting $t_0$, and the first TOA is $t_0=0$.

The next step (step 64) is to take the discrete Fourier transform (DFT) of x(n). The magnitude of the DFT contains all necessary information to determine how many pulse trains are present and their frequencies. By choosing appropriate data lengths, the DFT can easily be adapted to a fast Fourier transform (FFT) operation. Hence the computational cost of the technique is of the order of N log(N), as compared to $N^2$ for a sequence search algorithm technique.

In step 65, the method conducts an additional process of removing possible harmonics of a detected PRF. If $f_1$ is a pulse train frequency, then harmonics of $f_1$, (such as $2f_1$, $3f_1$ ...) will also exist in the spectrum and must be removed. For multiple pulse trains, in addition to its own harmonics, any combinations of individual PRFs must also be removed when they are in the range of interest.

Figure 8:
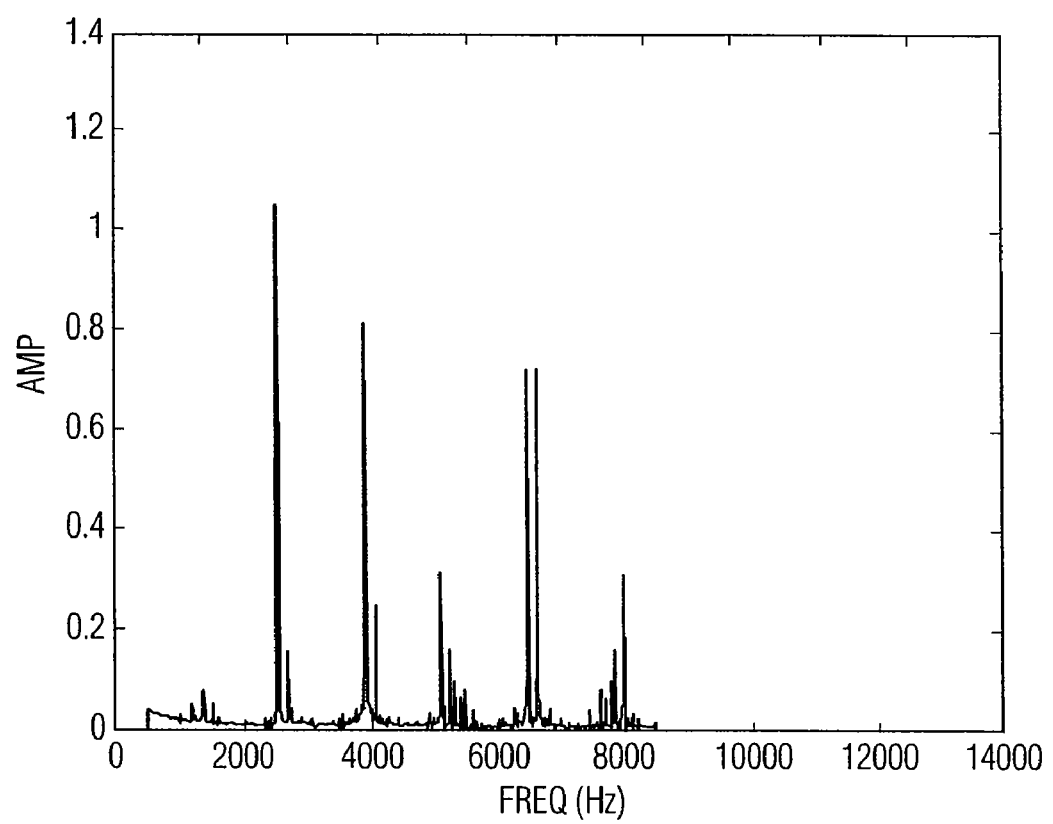
FIG. 8 is a plot of a raw fast Fourier transform (FFT) of TOAs of an input snapshot, used in accordance with an embodiment of the present invention.
Figure 9:
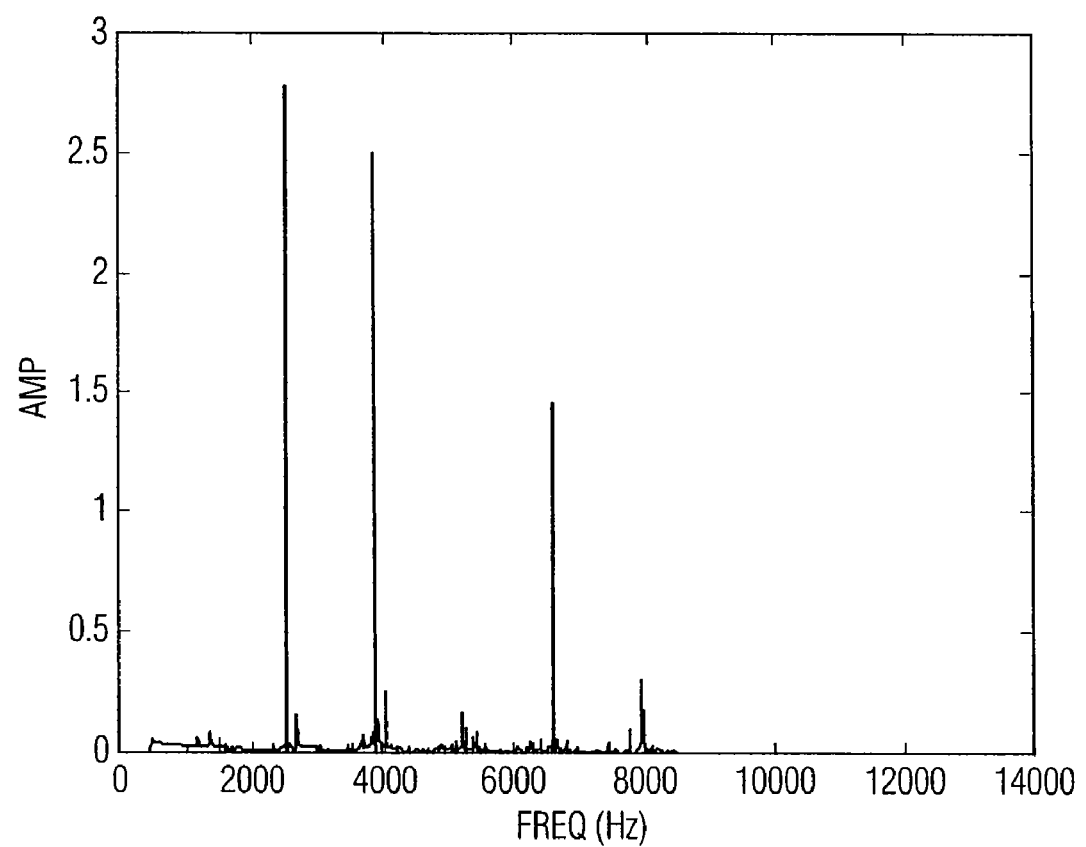
FIG. 9 is a corrected FFT of the TOAs of the input snapshot shown in FIG. 8.

As an example, FIGS. 8 and 9 illustrate the result of the spectrum estimation of the same snapshot including three pulse trains having PRIs of 151, 255 and 393 us. FIG. 8 is the raw spectrum and FIG. 9 is the "corrected" spectrum when all harmonics are removed.

Lastly, the spectrum estimation technique determines the PRI, after removing the harmonics of the signal (step 66). The determined PRI is then sent to pulse de-interleaving module 46B in FIG. 4A (step 67).

Figure 4C:
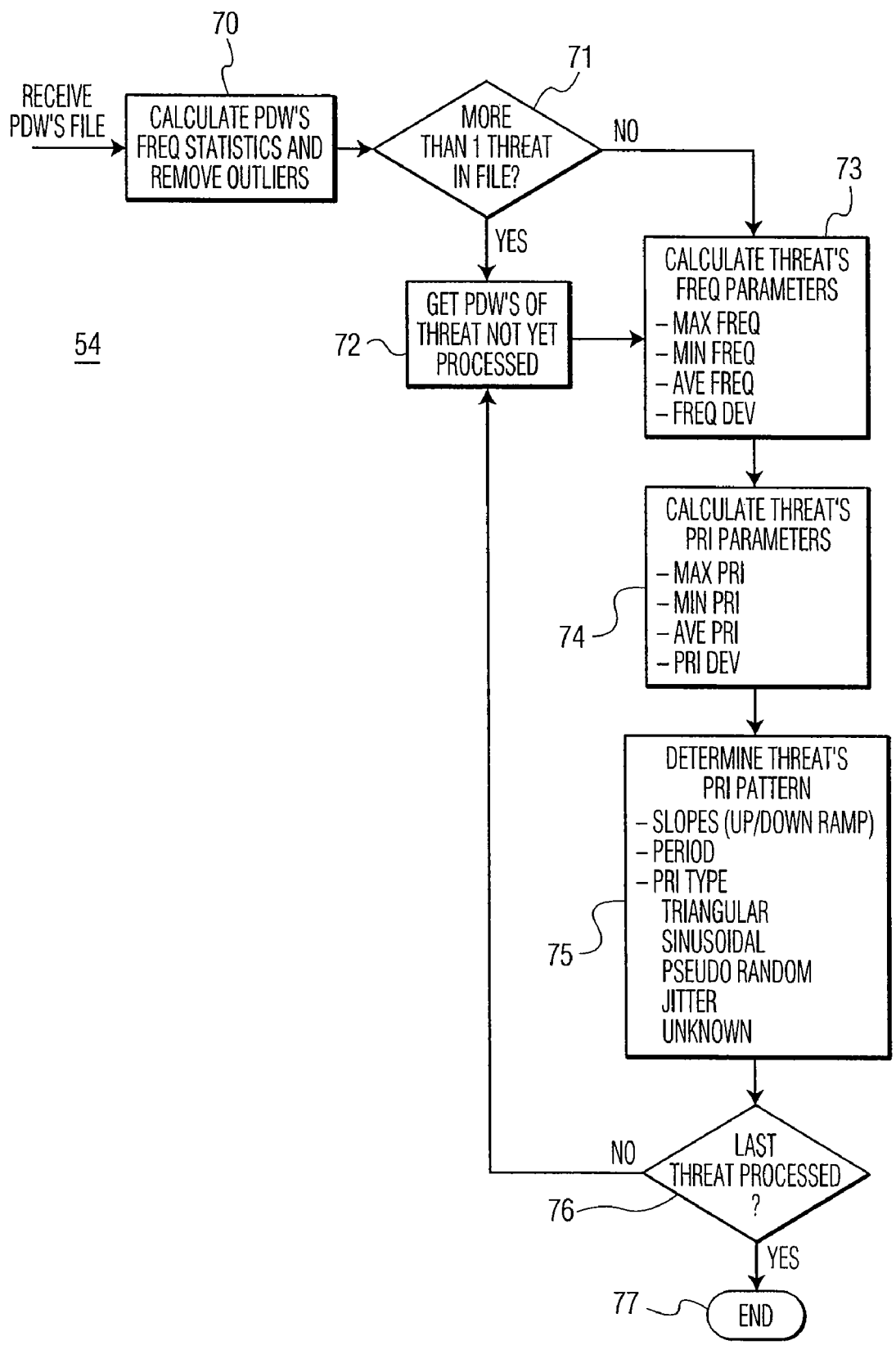

The pattern detection module, designated as 54, will now be described in greater detail. Referring to FIG. 4C, the method as executed by module 54, first enters step 70 after the PDW file is received. Step 70 calculates the frequency statistics of the received PDWs. The outlying PDWs are removed from the cluster. Decision box 71 then determines whether more than one threat is in the received PDW file. If only one threat is found in the received PDW file, then the method branches to step 73. Step 73 calculates various threat frequency parameters of the received PDW threat file. Such parameters include maximum frequency, minimum frequency, average frequency and frequency deviation. The method next enters step 74 to calculate various parameters for the threat's PRI. Such parameters include the maximum PRI, the minimum PRI, the average PRI and the PRI deviation.

Entering step 75, the method determines the threat's PRI pattern. Such pattern may include a slope (up/down ramp), such as a triangular slope. The pattern may also be sinusoidal, pseudo random, jitter or unknown. If the last threat has been processed, as determined by decision box 76, then the method ends in step 77. If, on the other hand, this is not the last threat processed, then the method branches to step 72. Step 72 obtains the PDWs of threats that have not yet been processed and the method repeats steps 73, 74 and 75. This process is repeated until all threats have been processed to end the method in step 77.

The next technique described is the Hough transform technique, which is an image processing technique for finding linear lines in a 2D image. The Hough transform is used by the present invention to detect radar pulse trains. To apply the Hough transform, the 1D TOA data in a snapshot must first be converted into a 2D image.

Figure 10:
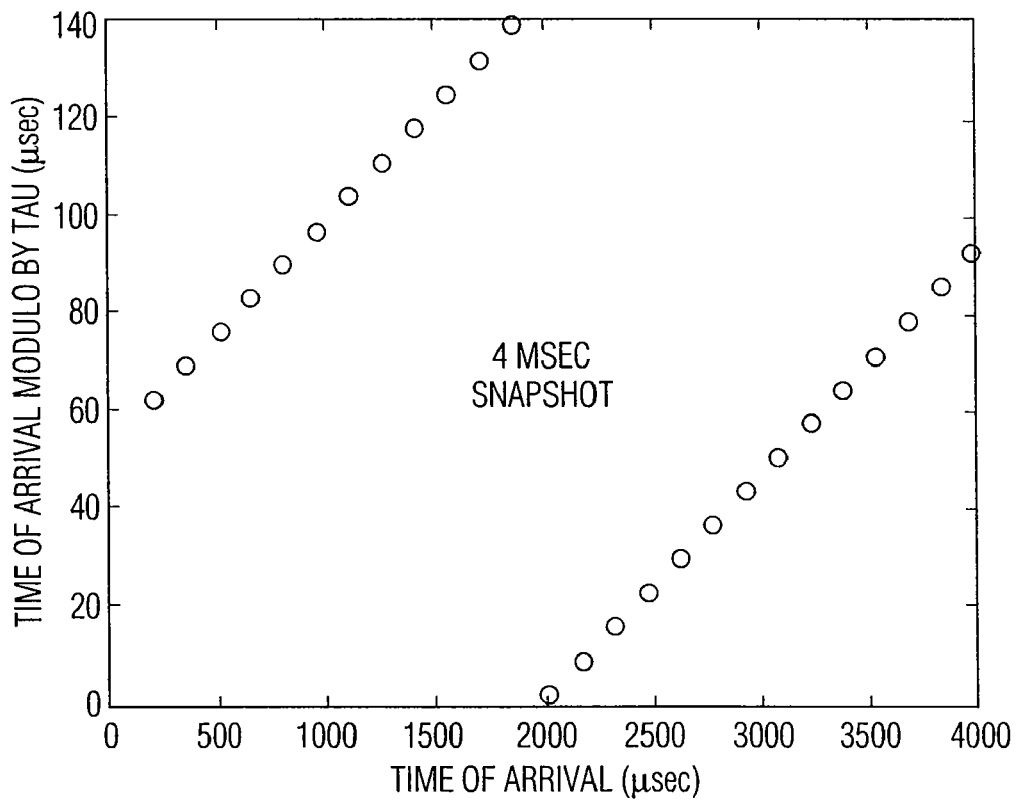
FIG. 10 is a waterfall plot of threat pulses interleaved in a 4 ms snapshot, used in accordance with an embodiment of the present invention.

As an example, assume there is only one pulse train present in a snapshot. When the TOA in a snapshot is plotted against TOA modulo by $\tau$, where $\tau$ is an arbitrary window width, a waterfall plot results. All data points (x, y) in the plot representing TOAs trace a sloped linear line $x=y+k\tau$. This line wraps back as it exceeds the window width $\tau$. FIG. 10 illustrates such a waterfall plot, when the PRI of the radar pulse train is 151 us, and $\tau$=144 us. The snapshot time is 4 ms.

Conversely, given a set of points on a line of gradient m of a waterfall plot, the PRI can also be determined. A particular gradient m would correspond to a class of PRIs, all harmonically related. The least of these $PRI_f$ is related to $\tau$ and m as follows:

$m=(PRI_f-\tau)/PRI_f$ and $PRI_f=\tau/(1-m)$

In a 2D binary image, the Hough transform is defined as:

$\rho = x \cos\theta + y \sin\theta$

The (x, y) is a rectangular coordinate of a data point where the image is not "0". The location is then transformed into ($\rho$, $\theta$) in a polar coordinate (or the intercept-gradient space). If data points $(x_1, y_1), (x_2, y_2), \ldots (x_N, y_N)$ are all on the same line $x=y+k\tau$, then their Hough transforms of $\rho=x_i \cos\theta+y_i \cos\theta$, $\tau=1, 2, \ldots N$, will all pass through the same point ($\rho_c$, $\theta_c$) where $\rho_c$ is the distance (or intercept), with a scale factor from the origin to the line $x=y+k\tau$, and $\tan\theta_c$ is the gradient of a linear line in the original rectangular coordinate.

Figure 11:
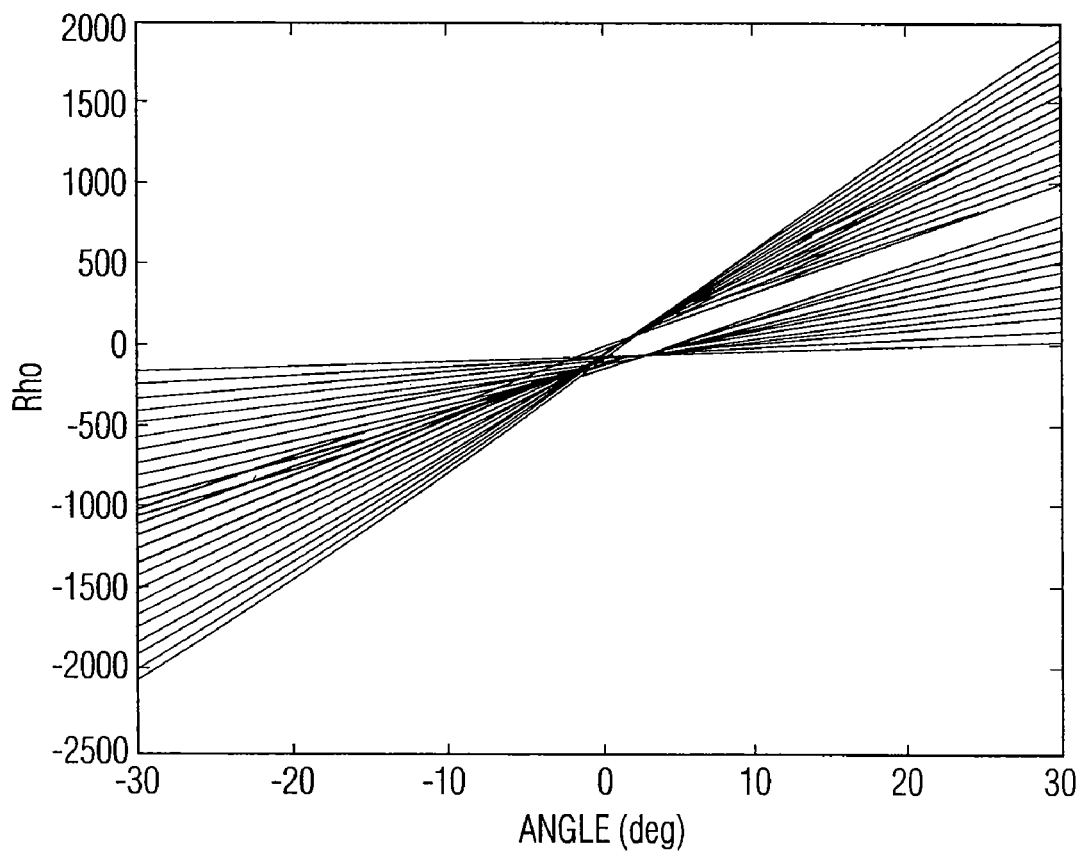
FIG. 11 is a plot of a Hough transform of the waterfall plot shown in FIG. 10, used in accordance with an embodiment of the present invention.

FIG. 11 is the Hough transform of FIG. 10. There are two groups of 12 and 14 lines passing through two focal points with the same gradient m but different intercept points. They correspond to the two sloped lines of the waterfall plot of FIG. 10. Thus, the Hough transform is equivalent to finding the number of points on a given line in a 2D image.

In a practical implementation, the result of a Hough transform must be placed into discrete ($\rho$–$\theta$) resolution bins. The Hough transform of a binary 2D image proceeds as follows:

(1) The intercept-gradient space is nullified and gridded with ($\rho$–$\theta$) bins. The size of the ($\theta$–$\rho$) bin is determined by the resolution required for detecting radar pulse trains.

(2) For each non-zero data point located at an $(x_i, y_i)$, a line $\rho=x_i \cos\theta+y_i \cos\theta$ in the gradient-intercept space is generated. This line is the Hough transform of point $(x_i, y_i)$. All bins on this line are then incremented by one. Since all points $(x_1, y_1), \ldots (x_N, y_N)$ on line $x=y+k\tau$ of the original 2D will pass through a single point ($\rho_c$, $\theta_c$), the accumulated "hits" on this ($\rho$–$\theta$) bin will be N.

(3) Since we are only interested in the gradient m of the line, all "hits" along the same gradient bins are added for better threshold detection.

(4) The threshold used for detection is closely related to the probability of detection, the probability of false alarm, the size of the snapshot and the window width $\tau$ used in the Hough transform.

(5) After a gradient m is detected, a radar pulse train with possible PRF of $PRI_f=\tau/(1-m)$ is declared.

As an example, a snapshot including three pulse trains having PRIs of 151, 255 and 393 us is used to demonstrate this algorithm. A series of Hough transforms are conducted with three different window width, $\tau$=144, 263 and 410 us. The results are summarized in FIGS. 12-14.

Figure 12A:
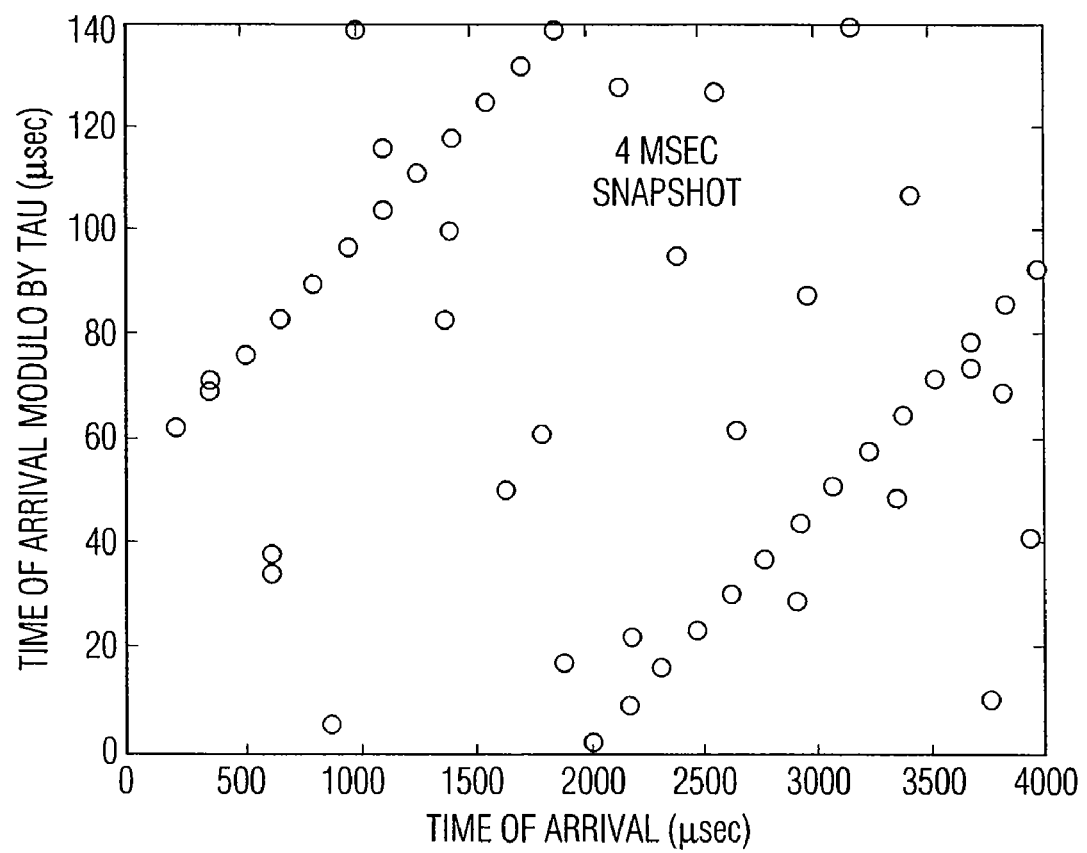
FIGS. 12A, 12B and 12C are, respectively, a waterfall plot of different threat pulses, a Hough transform of the waterfall plot, and a PRI detected by the Hough transform, in accordance with an embodiment of the present invention.
Figure 12B:
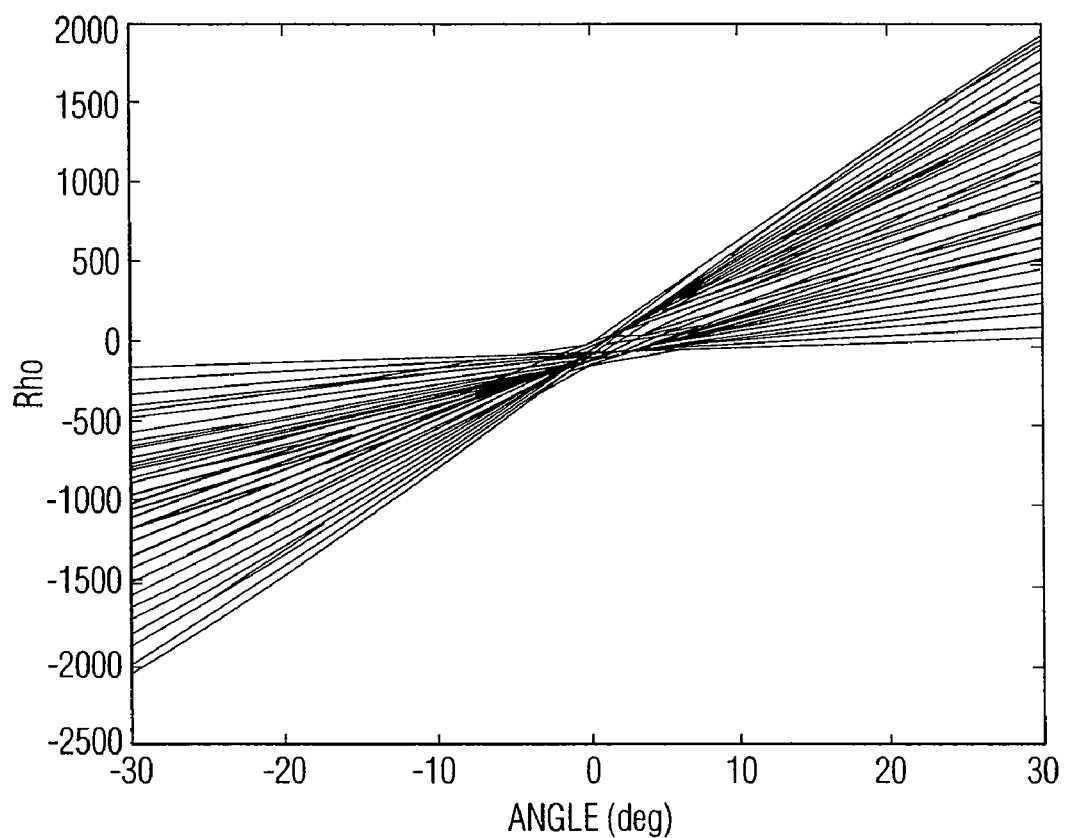
Figure 12C:
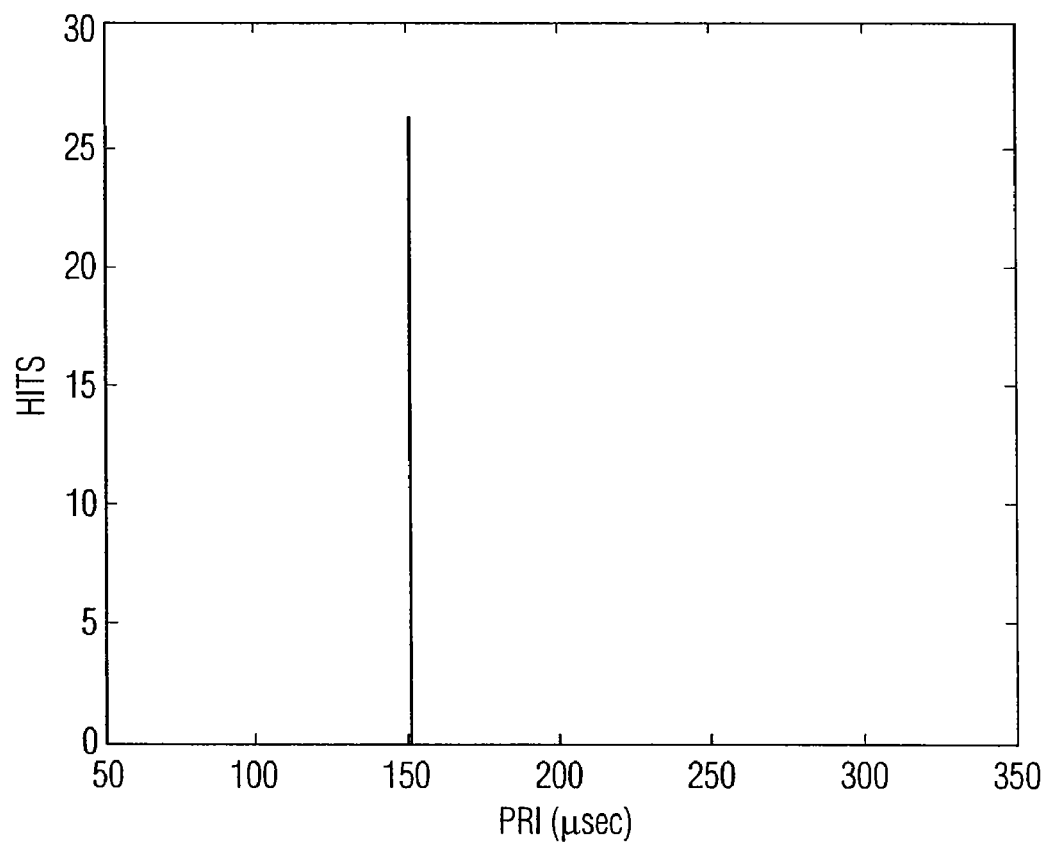

FIG. 12A illustrates the waterfall plot with $\tau$=144 us. The corresponding Hough transform is shown in FIG. 12B, and a radar pulse train with PRI=151 us is detected, as illustrated in FIG. 12C.

Figure 13A:
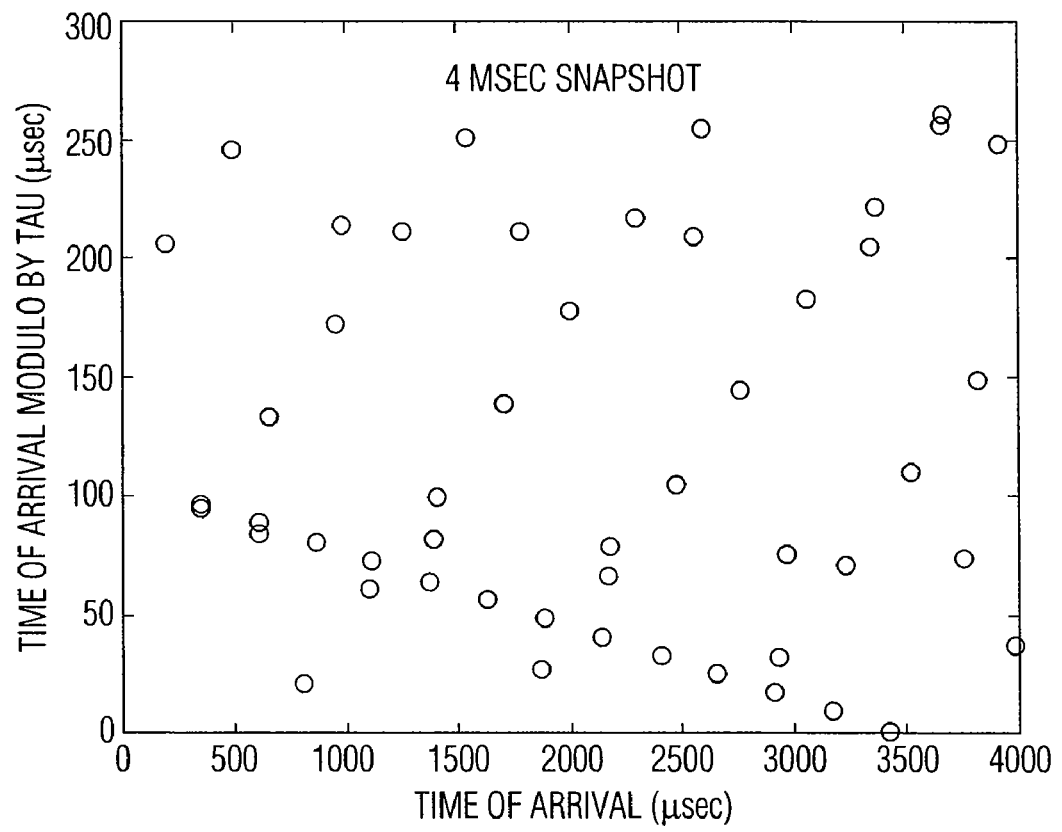
FIGS. 13A, 13B and 13C are, respectively, another waterfall plot of different threat pulses, another Hough transform of the waterfall plot, and another PRI detected by the Hough transform, in accordance with an embodiment of the present invention.
Figure 13B:
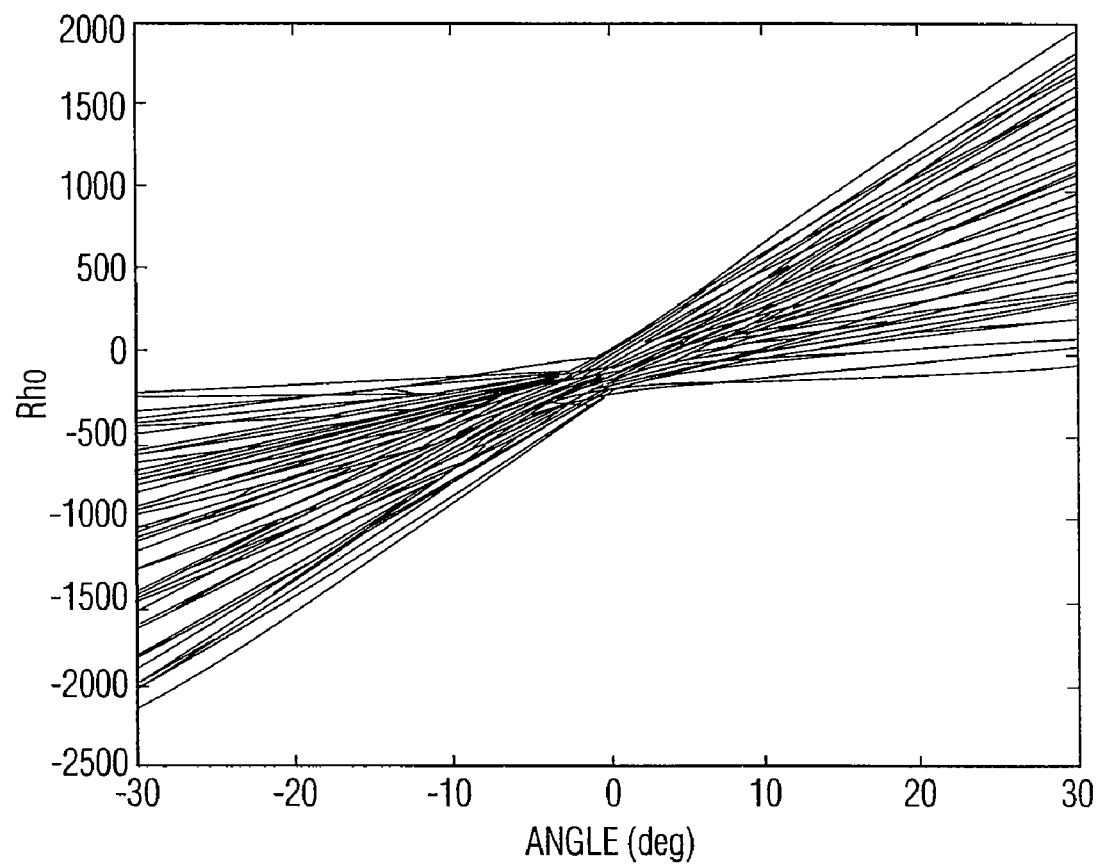
Figure 13C:
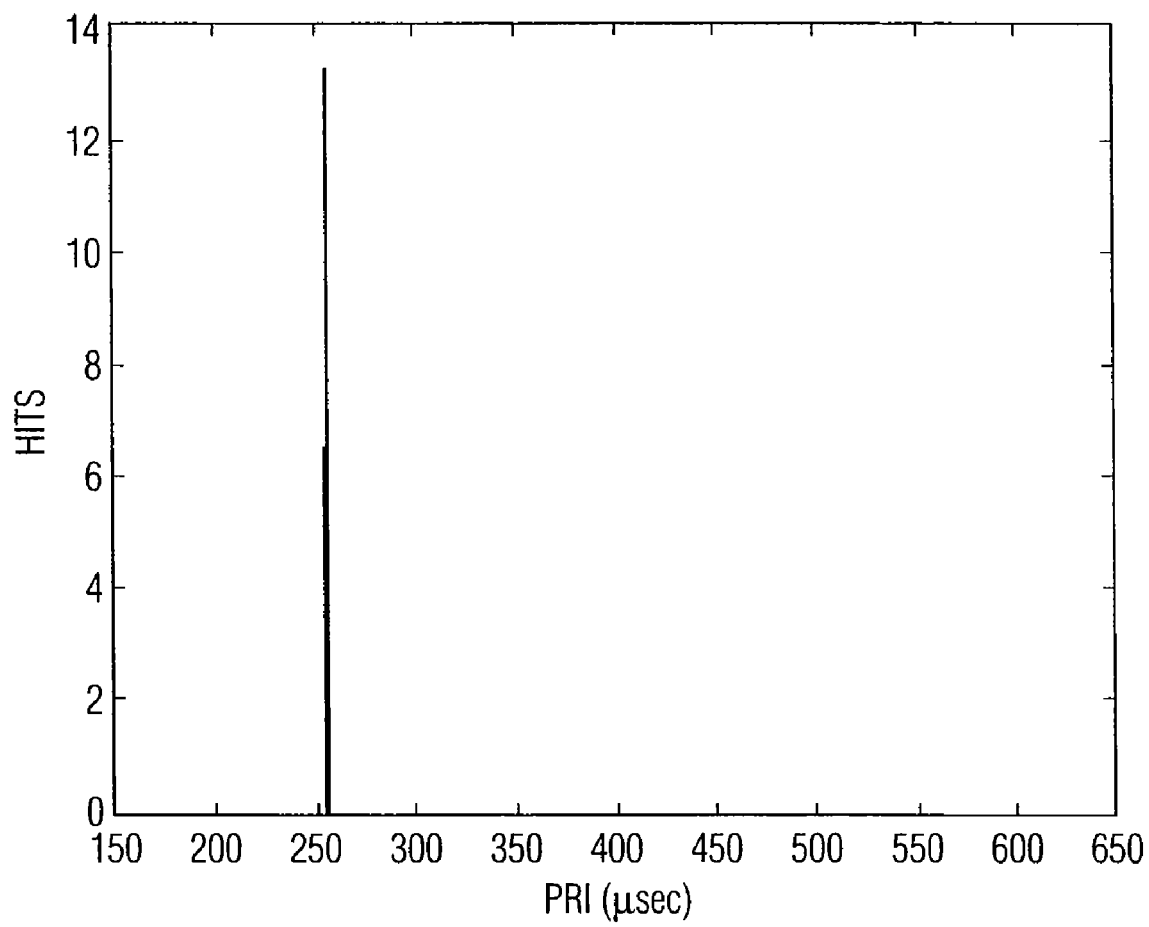

FIG. 13A illustrates the waterfall plot with $\tau$=263 us. The corresponding Hough transform is shown in FIG. 13B, and a radar pulse train with PRI=255 us is detected, as illustrated in FIG. 13C.

Figure 14A:
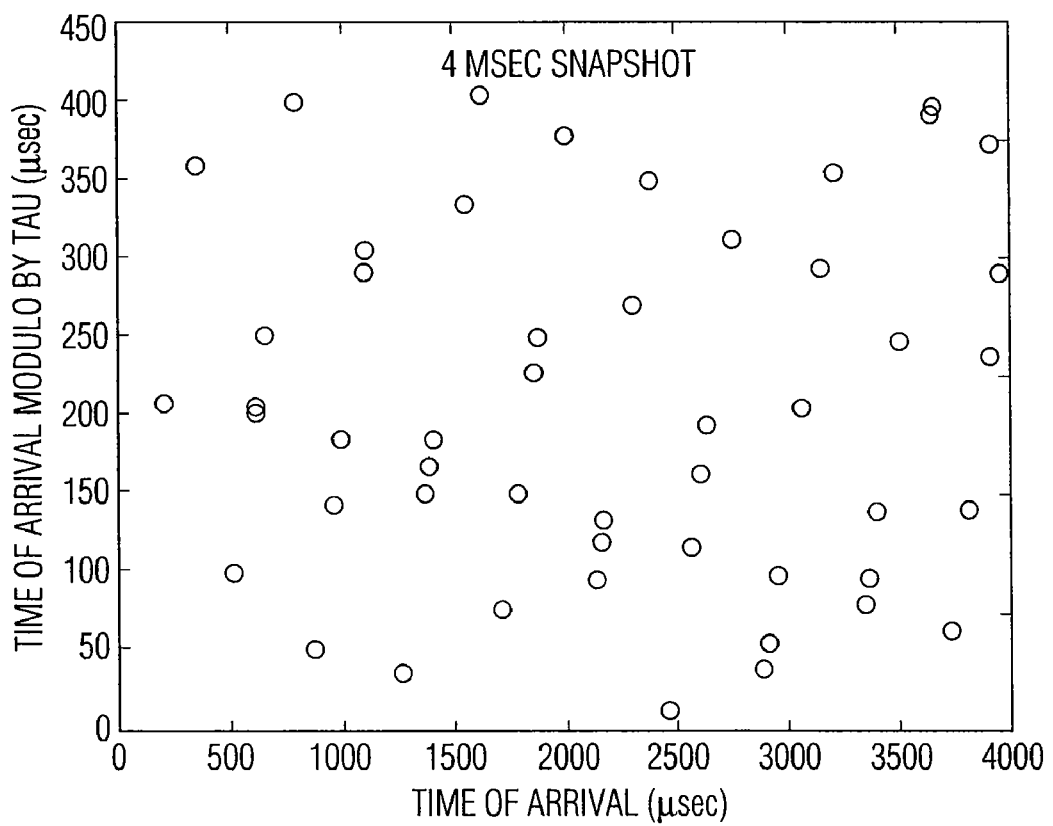
FIGS. 14A, 14B and 14C are, respectively, yet another waterfall plot of different threat pulses, yet another Hough transform of the waterfall plot, and yet another PRI detected by the Hough transform, in accordance with an embodiment of the present invention.
Figure 14B:
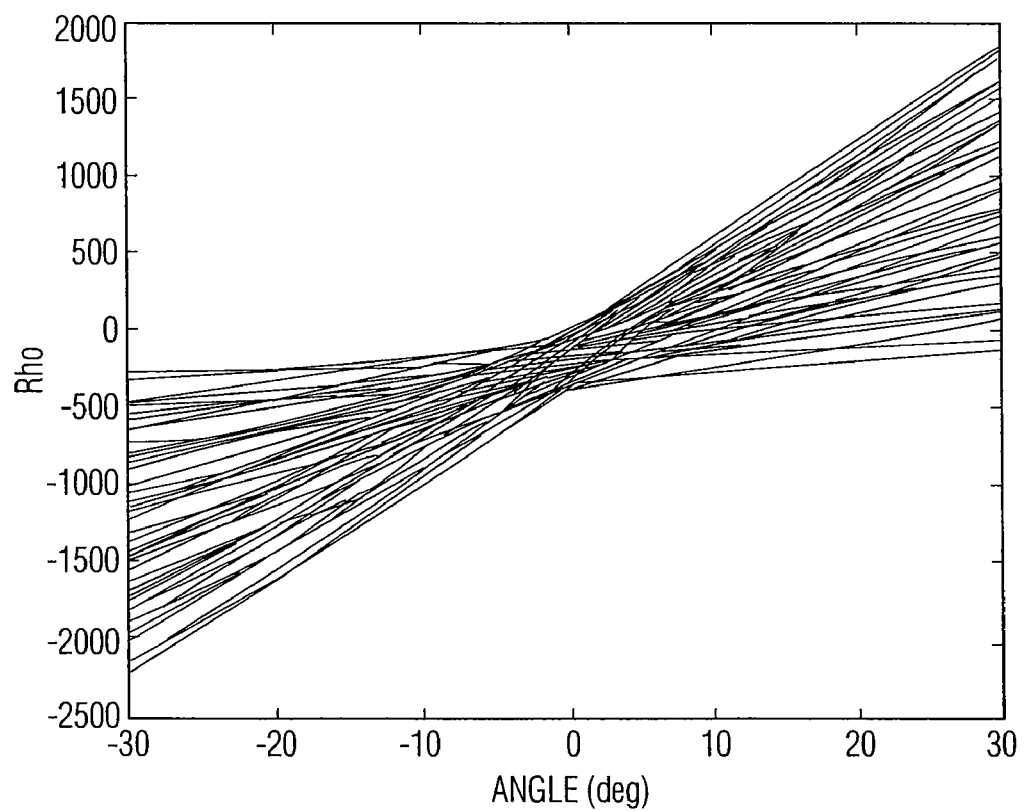
Figure 14C:
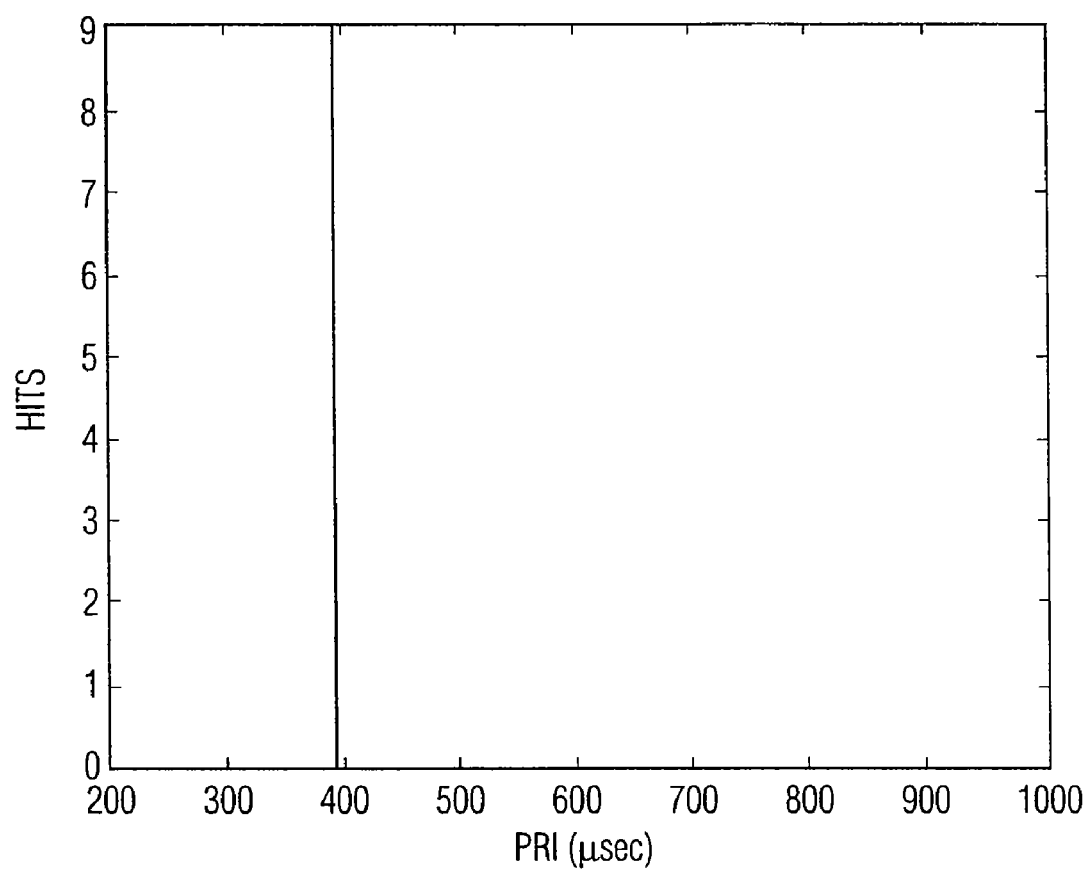

Similarly, FIG. 14A illustrates the waterfall plot with $\tau$=410 us. The corresponding Hough transform is shown in FIG. 14B, and a radar pulse train with PRI=393 us is detected, as illustrated in FIG. 14C.

Thus, all three PRIs are detected with Hough transforms. Although Hough transform is computational intensive, many "fast" Hough transform algorithms are available. There are also VLSI implementations of Hough transform available off-the-shelf, with computation rate better than 1 us per data point.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of classifying radar emitters comprising the steps of:
   (a) receiving pulses from multiple radar emitters;
   (b) categorizing received pulses based on pulse data descriptors (PDWs);
   (c) forming clusters of received pulses based on the PDWs; and
   (d) extracting pulses from at least one of the formed clusters, based on pulse repetition intervals (PRIs) between the extracted pulses, to form a pulse train belonging to a radar emitter;
   wherein forming clusters includes sorting the PDWs based on each PDW's Euclidean distance from the center of a respective cluster.

2. The method of claim 1 wherein
   step (d) includes de-interleaving pulses from the cluster using a differential time of arrival (DTOA) histogram technique.

3. The method of claim 2 including
   subtracting a TOA of each pulse from every subsequent time of arrival (TOA) of other pulses to form differential TOAs, and
   accumulating the differential TOAs which are substantially similar to each other into respective bins to form the DTOA histogram.

4. The method of claim 3 including
   correcting the DTOA histogram by removing an accumulated DTOA formed in a second bin that is a harmonic of an accumulated DTOA formed in a first bin, the first bin having a lower PRI than the second bin.

5. The method of claim 1 wherein
   step (a) includes receiving the pulses during a predetermined time interval and storing the received pulses as a snapshot representing the pulses present during the predetermined time interval.

6. The method of claim 1 wherein
   step (d) includes de-interleaving pulses from the cluster using a spectrum estimation technique.

7. The method of claim 6 including
   denoting a plurality of pulse trains in the cluster as a complex signal;
   forming a discrete Fourier transform (DFT) of the complex signal; and
   determining a number for the plurality of pulse trains and a frequency of each pulse train.

8. The method of claim 7 including
   removing a pulse train from the plurality of pulse trains in the cluster, when a frequency of the pulse train is a harmonic of another frequency of another pulse train.

9. The method of claim 1 wherein
   step (d) includes de-interleaving pulses from the cluster using a Hough transform technique.

10. The method of claim 9 including
    calculating a straight line, based on TOA of pulses from the cluster versus TOA modulo by $\tau$, where $\tau$ is an arbitrary window width;
    determining a slope of the straight line; and
    calculating a pulse repetition interval (PRI) of a pulse train in the cluster based on the slope of the straight line.

11. A method of classifying radar emitters comprising the steps of:
    (a) receiving pulses from multiple radar emitters;
    (b) categorizing received pulses based on pulse data descriptors (PDWs);
    (c) forming clusters of received pulses based on the PDWs; and
    (d) de-interleaving pulses from the cluster using one of a differential time of arrival (DTOA) histogram technique, a spectrum estimation technique, or a Hough transform technique;
    wherein forming clusters includes sorting the PDWs based on each PDW's Euclidean distance from the center of a respective cluster.

12. The method of claim 11 wherein
    step (a) includes receiving the pulses during a predetermined time interval and storing the received pulses as a snapshot representing the pulses present during the predetermined time interval.

13. The method of claim 12 wherein
    the predetermined time interval varies between 4 msec. and 800 msec.

14. The method of claim 12 wherein
    the PDWs include at least radio frequency (RF) data and pulse width (PW) data for each received pulse.

15. The method of claim 14 wherein
    the PDWs includes pulse amplitude (PA).

16. The method of claim 11 wherein
    step (b) includes categorizing the received pulses based on vectors, each vector comprised of a sum of weighted PDWs.

17. A system for classifying radar emitters comprising
    a receiver for receiving a plurality of signals from radar emitters,
    a processor coupled to the receiver for
      (a) generating data components for each signal received from the radar emitters,
      (b) forming multi-dimensional samples from the generated data components,
      (c) sorting the multi-dimensional samples into a plurality of data clusters, based on their respective proximity to a center of each data cluster, and
      (d) extracting pulses from at least one of the formed clusters, based on pulse repetition intervals (PRIs) between the extracted pulses, to form a pulse train belonging to a radar emitter,
    wherein the processor is configured to sort the multi-dimensional samples based on each sample's Euclidean distance from the center of a respective cluster.

18. The system of claim 17 wherein the processor is configured for de-interleaving pulses from the at least one cluster using one of a differential time of arrival (DTOA) histogram technique, a spectrum estimation technique, or a Hough transform technique.

19. The system of claim 17 including
    a storage device for storing the received signals as a snapshot representing received signals present during a predetermined time interval,
    wherein the processor is configured to generate data components for each of the received signal stored as a snapshot.

* * * * *